US006819346B2

United States Patent
Ozaki et al.

(10) Patent No.: US 6,819,346 B2
(45) Date of Patent: Nov. 16, 2004

(54) APPARATUS FOR AND METHOD OF RECORDING IMAGES

(75) Inventors: Takao Ozaki, Odawara (JP); Atsushi Suganuma, Minamiashigara (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 10/046,078

(22) Filed: Jan. 16, 2002

(65) Prior Publication Data
US 2002/0093561 A1 Jul. 18, 2002

(30) Foreign Application Priority Data
Jan. 18, 2001 (JP) ........................................ 2001-010608

(51) Int. Cl.$^7$ .............................................. B41J 29/16
(52) U.S. Cl. ..................................................... 347/179
(58) Field of Search .......................... 347/179, 14, 19, 347/103, 175, 218, 220, 132, 139; 101/416; 399/167; 400/120.16, 124.05, 120.01

(56) References Cited

U.S. PATENT DOCUMENTS 5,774,162 A * 6/1998 Fukuda ....................... 347/175
5,813,347 A * 9/1998 Baumann ..................... 101/486
5,889,534 A * 3/1999 Johnson et al. ................ 347/19
5,953,034 A * 9/1999 Salomon et al. ............. 347/103

FOREIGN PATENT DOCUMENTS

| JP | 05-207250 | 8/1993 |
| JP | 9-149211 | 6/1997 |
| JP | 10-16290 | 1/1998 |

\* cited by examiner

Primary Examiner—K. Feggins
(74) Attorney, Agent, or Firm—Sughrue Mion, PLLC

(57) ABSTRACT

An image recording apparatus records an image on a printing plate wound around a rotating drum with a light beam emitted from an exposure head. In the image recording apparatus, an actual drum rotational speed Nx is recognized, and the image is recorded on the printing plate in an accelerating period in which the actual drum rotational speed Nx is equal to or higher than a predetermined rotational speed, a constant-rotational-speed period, and a decelerating period. An exposure beam position, an exposure beam output, and an auxiliary scanning speed of the exposure head are corrected dependent on the peripheral speed of the drum in the accelerating period and the decelerating period.

23 Claims, 22 Drawing Sheets

FIG. 5

| STORAGE AREA | | ADDRESS | DATA |
|---|---|---|---|
| 53a | BASIC DELAY TIME DATA td | ADa $\vert$ ADb | td1 $\vert$ td2 $\vert$ td3 |
| | | | |
| 53b | ACCELERATING PERIOD CORRECTION DELAY TIME | ADc $\vert$ ADd | Td1 $\vert$ Td2 |
| | | | |
| 53c | DECELERATING PERIOD CORRECTION DELAY TIME | ADe $\vert$ ADf | Td2 $\vert$ Td3 |
| | | | |
| 53d | ACCELERATING PERIOD LASER OUTPUT | ADg $\vert$ ADh | Pwa $\vert$ Pwc |
| | | | |
| 53e | DECELERATING PERIOD LASER OUTPUT | ADi $\vert$ ADj | Pwc $\vert$ Pws |
| | | | |

⋮

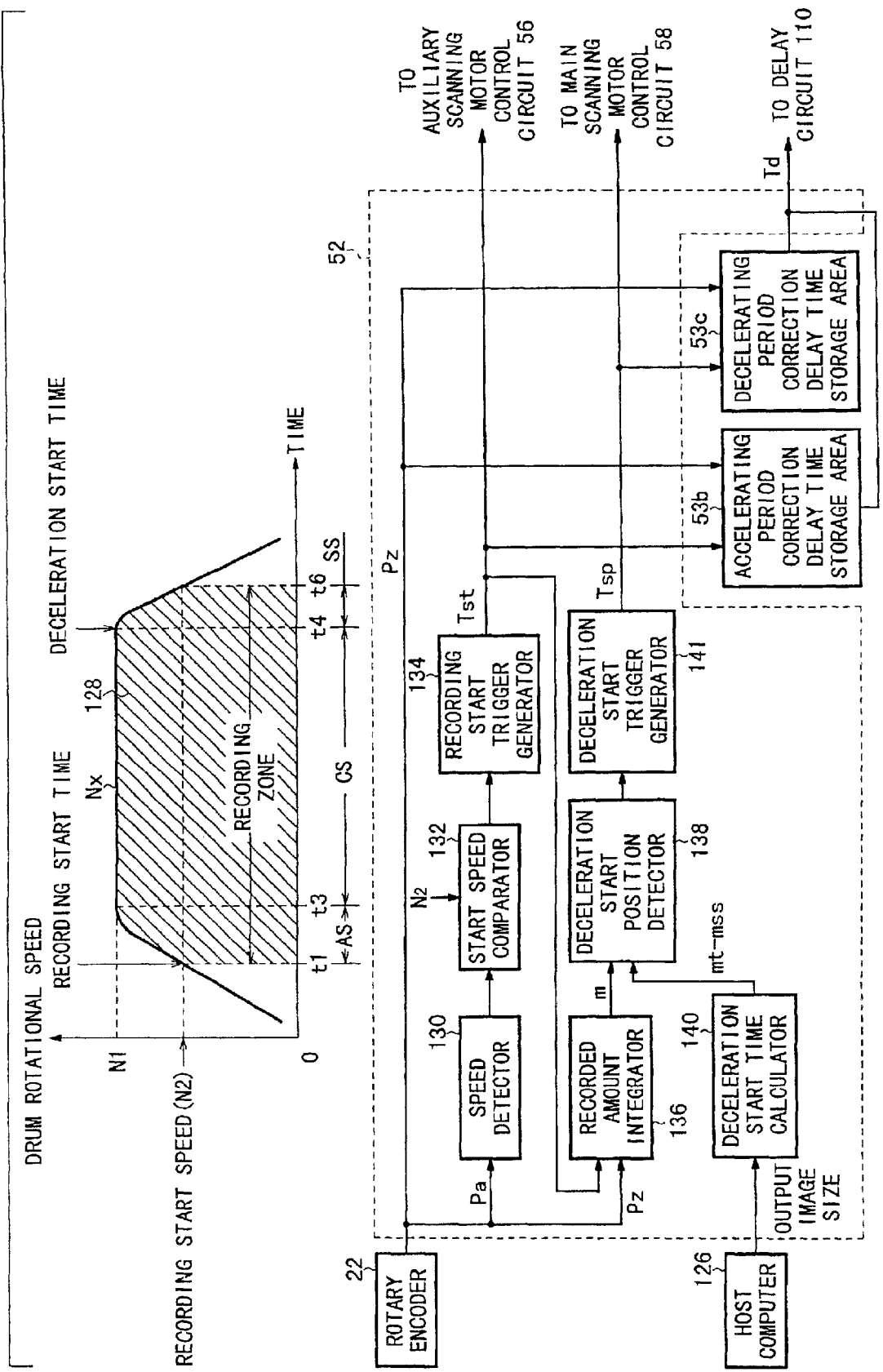

FIG. 17

| ADDRESS | FREQUENCY-DIVIDING RATIO (Ddiv) | PRESET VALUE (Dpre) | APPARATUS OPERATING STATUS |
|---|---|---|---|
| 1 | 100 | 50 | ACCELERATION STARTED |
| 2 | 95 | 48 | IN ACCELERATION |
| 3 | 90 | 46 | DITTO |
| 4 | 85 | 44 | DITTO |
| 5 | 80 | 1000 | AT CONSTANT SPEED |
| 6 | 85 | 44 | DECELERATION STARTED |
| 7 | 90 | 46 | IN DECELERATION |
| 8 | 95 | 48 | DITTO |
| 9 | 100 | 50 | DECELERATION ENDED |

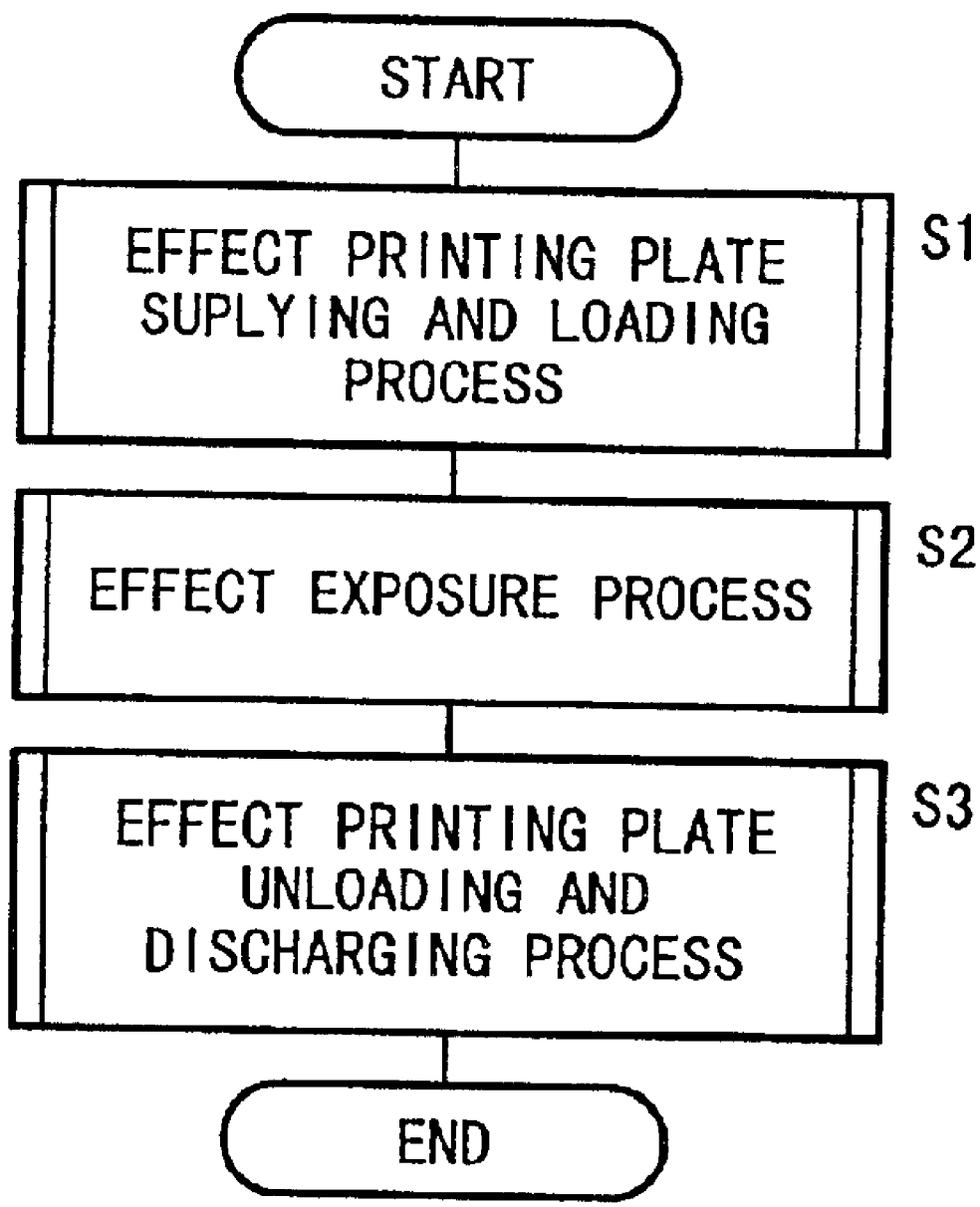

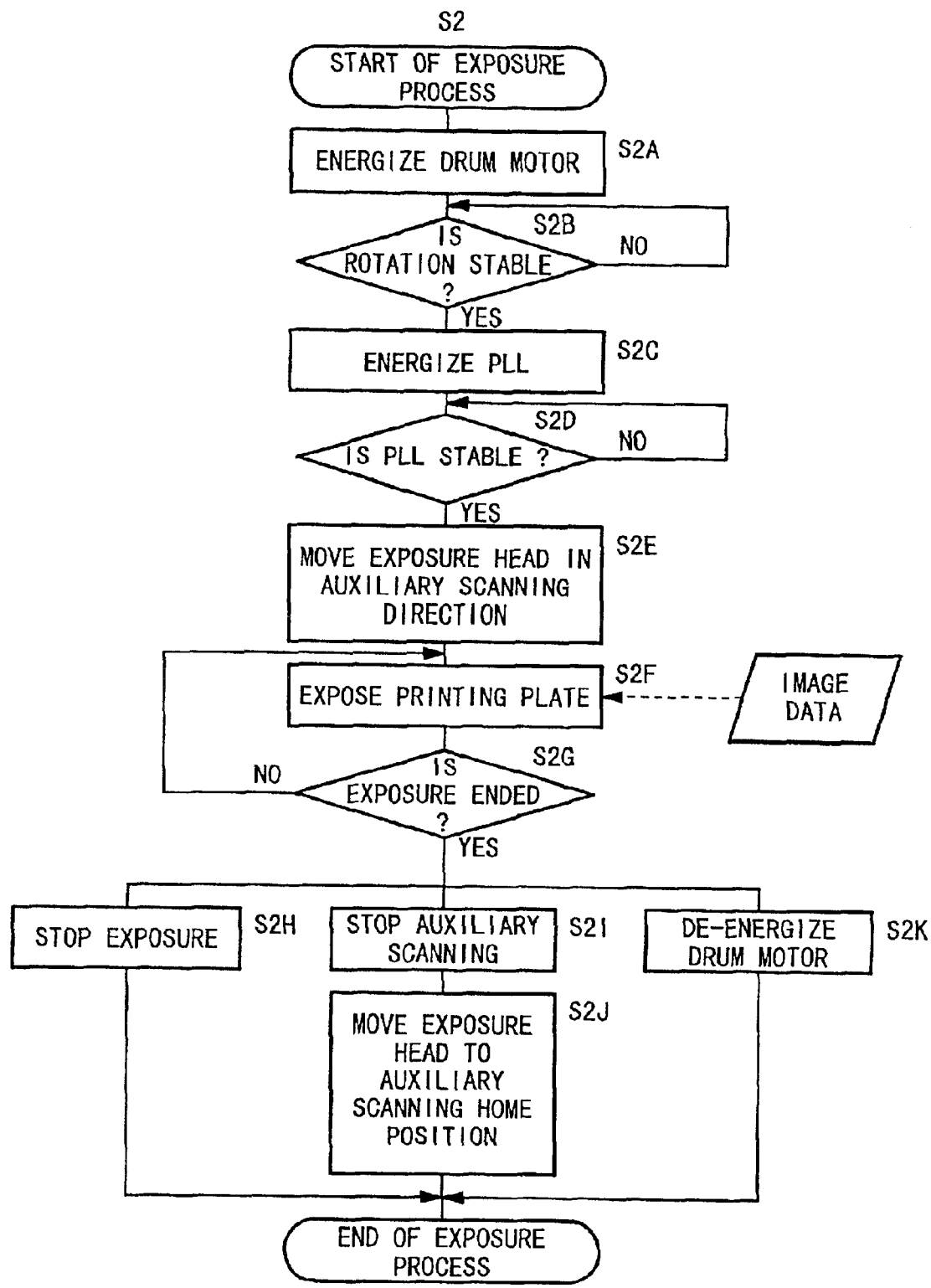

APPARATUS FOR AND METHOD OF RECORDING IMAGES

BACKGROUND OF THE INVENTION

1. Field of the Invention

The present invention relates to an apparatus for and a method of recording a two-dimensional image on a recording sheet with a recording head, and more particularly to an image recording apparatus preferably for use as an external-surface-scanning image recording apparatus for recording an image on a recording sheet such as a printing plate or the like on the outer circumferential surface of a drum which is being rotated, and a method of recording an image with such an image recording apparatus.

2. Description of the Related Art

Heretofore, it is known that a cylindrical drum is rotated at a constant speed and a recording sheet such as a photosensitive sheet mounted on the outer circumferential surface of the rotating drum is scanned in a main scanning direction with a light beam that is emitted from a recording head and also in an auxiliary scanning direction by moving the recording head along the axis of the drum for thereby recording a two-dimensional image on the surface of the photosensitive sheet (see, for example, Japanese laid-open patent publication Nos. 5-207250, 9-149211, and 10-16290).

FIG. 21 of the accompanying drawings shows a general processing sequence of such an image recording apparatus.

In step S1 shown in FIG. 21, a photosensitive sheet is supplied and loaded onto the drum, and mounted on the outer circumferential surface of the drum.

In step S2, the photosensitive sheet mounted on the drum is exposed to light. The exposed photosensitive sheet is then unloaded and discharged from the drum in step S3, and supplied to a next process.

FIG. 22 of the accompanying drawings shows details of the exposure process in step S2 shown in FIG. 21.

When the exposure process is started, a drum motor for rotating the drum is energized in step S2A. Then, it is determined in step S2B whether the rotational speed of the drum has reached a constant rotational speed and has been stabilized at the constant rotational speed or not.

If the rotational speed of the drum has been stabilized, then a PLL (Phase-Locked Loop) circuit is energized with pulses from an encoder mounted on the shaft of the drum in step S2C. In step S2D, it is determined whether the phase-locked loop is stabilized or not based on an output signal from the PLL circuit.

If the phase-locked loop is stabilized, then the recording head is moved in the auxiliary scanning direction in step S2E. In step S2F, image data read in synchronism with a recording clock generated from the output signal from the PLL circuit is supplied to the recording head, which emits a light beam modulated in intensity by the image data. The emitted light beam is applied to scan the photosensitive sheet in the main scanning direction, thus exposing the photosensitive sheet to the light beam.

If the end of the exposure of the photosensitive sheet for one image is confirmed in step S2G, the exposure of the photosensitive sheet to the light beam is stopped in step S2H, the movement of the optical system in the auxiliary scanning direction is stopped in step S2I, followed by returning the recording head to its home position in the auxiliary scanning direction in step S2J, and the drum motor is de-energized in step S2K. In this manner, the exposure process in step S2 is put to an end.

As can be understood from the operation of the conventional image recording apparatus in steps S2B through S2G, the exposure of the photosensitive sheet to the light beam to record image information on the photosensitive sheet (writing or drawing process) is started after the drum reaches a constant rotational speed and its rotation is stabilized, i.e., after the drum enters a constant-speed rotating state.

In order to increase the productivity in the exposure recording process time (cycle time) for the photosensitive sheet in recent years, it has been proposed to increase the rotational speed (constant rotational speed) of the drum from the conventional speed ranging from 200 to 300 rpm to a speed of 1000 rpm or higher.

If the rotational speed of the drum in the exposure recording process is to be increased, then the startup time required for the drum to reach the high rotational speed and the shutdown time required for the drum to fall from the high rotational speed to a stop are increased. Though the overall operating time of the image recording apparatus from the start of drum rotation to the stop of drum rotation is shortened, the effect that the startup time and the shutdown time have on the productivity is non-negligibly large.

As the drum is rotated at a higher rotational speed, the drum produces larger centrifugal forces. Therefore, the wall thickness of the drum needs to be increased in order to avoid a distortion of images due to physical irregularities such as eccentricity of the drum. If the drum has an increased wall thickness, however, the drum becomes heavier and suffers a greater inertial moment. Consequently, the drum motor needs to produce a larger power output so as to make the startup time and the shutdown time equivalent to those in the conventional recording apparatus.

However, the drum motor with the higher power output is problematic in that its electric power consumption, cost, volume, and weight are increased.

SUMMARY OF THE INVENTION

It is therefore an object of the present invention to provide an apparatus for and a method of recording an image while minimizing a loss of a recording time due to a startup time and a shutdown time for the rotation of a drum and increasing the productivity (cycle time) of a recording process for recording an image on a recording sheet at a low cost.

Another object of the present invention is to provide an apparatus for and a method of recording an image while increasing the productivity of a recording process even if a motor with the same power output as is conventional is used.

According to the present invention, a recording head records an image on a recording sheet held on an outer circumferential surface of a drum in at least one of an accelerating period in which a rotational drive source accelerates the drum from a stop to a constant rotational speed and a decelerating period in which the rotational drive source decelerates the drum from the constant rotational speed to a stop, and in a constant-rotational-speed period in which the rotational drive source rotates the drum at the constant rotational speed. Therefore, even though the accelerating period and the decelerating period are time-consuming, since the image is recorded in these periods, the productivity of image recording is increased. The recording sheet may comprise a printing plate (direct plate) or a sheet-like photosensitive material such as a PS plate or the like.

The apparatus further comprises recording position correcting means for correcting the position in which the recording head records the image on the recording sheet depending on the peripheral speed of the drum in at least one of the accelerating period and the decelerating period, and recording output correcting means for correcting a recording output from the recording head depending on the peripheral speed of the drum. With this arrangement, the linearity which is an element indicative of the accuracy of the image is prevented from being degraded in the accelerating period and/or the decelerating period.

The recording position correcting means may be arranged to change the speed of the recording head moved by the auxiliary scanning direction moving means.

The recording position correcting means may be arranged to change the frequency of a main scanning write clock signal which is generated depending on the rotational speed of the drum.

The recording position correcting means may be arranged to change the frequency of the main scanning write clock signal by incorporating a variation corresponding to a change in the rotational speed of the rotational drive source into a PLL circuit which detects the rotational speed of the drum and generates a main scanning write clock signal.

The recording position correcting means may be arranged to have a delay circuit connected to an output terminal of a PLL circuit for delaying a predetermined delay depending on the rotational speed of the rotational drive source in the accelerating period or the decelerating period for generating a delayed main scanning write clock signal.

The recording position correcting means may be arranged to start correcting the position in which the recording head records the image on the recording sheet when the rotational speed of the drum becomes equal to or higher than a predetermined speed in the accelerating period.

The recording position correcting means may be connected to a recorded-amount-of-image detecting means for detecting an amount of image to be recorded on the recording sheet, and may be arranged to start correcting the position in which the recording head records the image on the recording sheet in the decelerating period when the recorded-amount-of-image detecting means detects that a remaining amount of image to be recorded reaches a predetermined amount.

According to the present invention, there is also provided a method of recording an image with an image recording apparatus for recording a two-dimensional image on a recording sheet held on an outer circumferential surface of a drum rotated by a rotational drive source by scanning the recording sheet with a recording head in a main scanning direction perpendicular to an axis of the drum and moving the recording head with an auxiliary scanning direction moving means in an auxiliary scanning direction extending along the axis of the drum which is substantially perpendicular to the main scanning direction, the method comprising the step of recording an image on the recording sheet held on the outer circumferential surface of the drum with the recording head in at least one of an accelerating period in which the rotational drive source accelerates the drum from a stop to a constant rotational speed and a decelerating period in which the rotational drive source decelerates the drum from the constant rotational speed to a stop.

With the above method, since an image is recorded in the accelerating period and the decelerating period as well as in the constant-rotational-speed period, the productivity of recording the image on the recording sheet is increased.

The apparatus for and the method of recording an image according to the present invention are preferably applicable to a light beam image recording apparatus for recording an image with a light beam outputted from the exposure head to the recording sheet.

The apparatus for and the method of recording an image according to the present invention are also preferably applicable to an external-surface-scanning ink-jet image recording apparatus for recording an image by applying an ink from an ink jet recording head to the recording sheet.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is a diagram of a memory map which stores various corrective data;

FIG. 6 is a functional block diagram illustrating the manner in which a recording start trigger is generated;

FIG. 17 is a diagram showing data stored in a speed setting memory for the feeding of a recording sheet in an auxiliary scanning direction;

FIG. 21 is a flowchart of a general exposure sequence; and

FIG. 22 is a flowchart of a conventional exposure process in the exposure sequence shown in FIG. 21.

DESCRIPTION OF THE PREFERRED EMBODIMENTS

Figure 1:
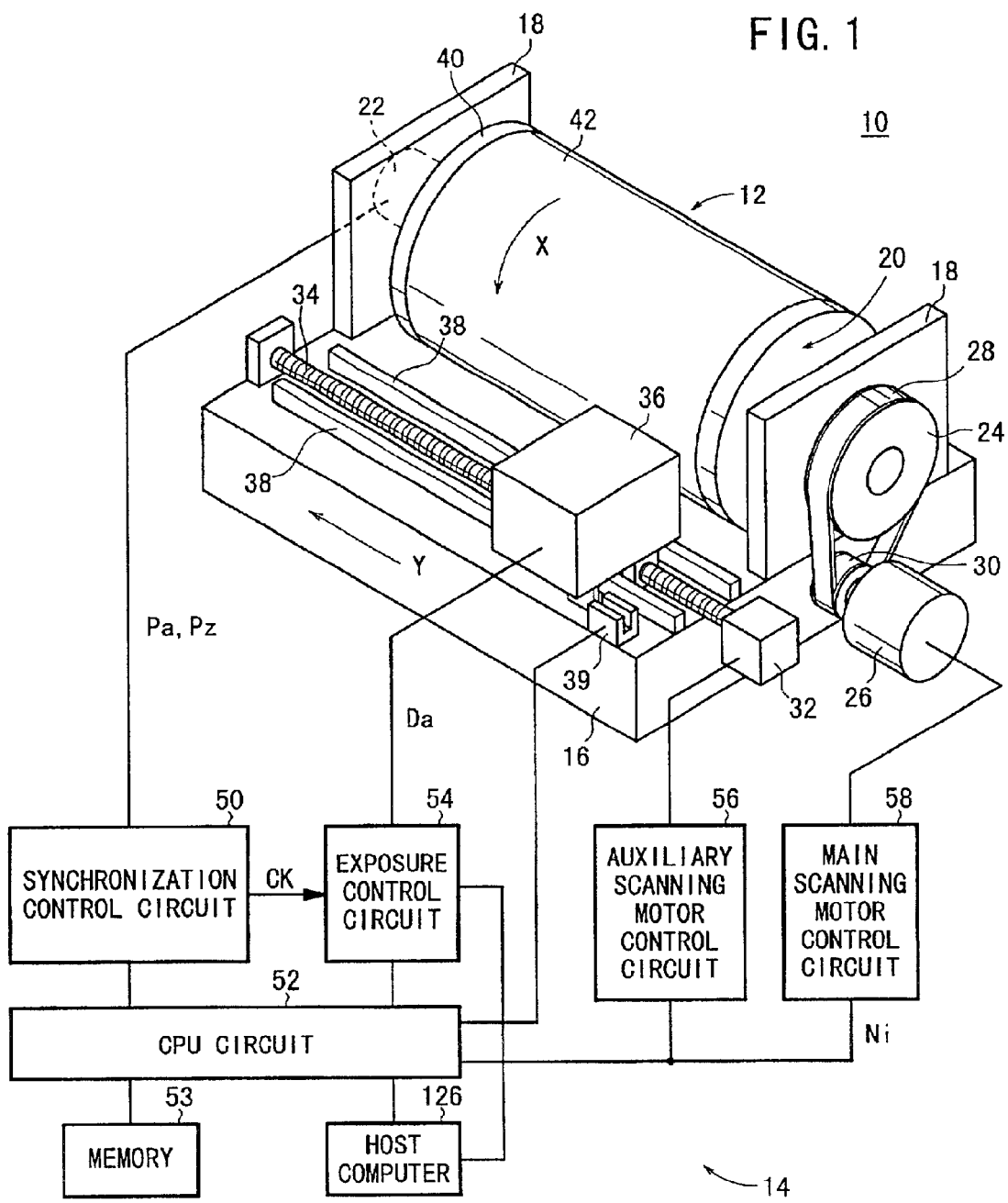
FIG. 1 is a perspective view, partly in block form, of an external-surface-scanning light beam image recording apparatus according to an embodiment of the present invention.

FIG. 1 schematically shows in perspective, partly in block form, an external-surface-scanning light beam image recording apparatus 10 according to an embodiment of the present invention.

The light beam image recording apparatus 10 comprises a recording mechanism 12 made up of mechanical components and a controller 14 made up of electrical components for controlling the mechanical components of the recording mechanism 12 for performing an image recording process.

A basic arrangement of the recording mechanism 12 will first be described below. The recording mechanism 12 has a flat base 16 and a pair of drum mount plates 18 disposed on the flat base 16 in horizontally confronting relationship to each other.

A drum 20 is rotatably mounted on and disposed between the drum mount plates 18 by its shaft for rotation about its own axis in the main scanning direction indicated by the arrow X, i.e., in the circumferential direction of the drum 20. The drum 20 may comprise a cylinder of aluminum having a diameter of about 300 mm and a length of about 1 mm.

To one end of the shaft of the drum 20, there is attached a rotary encoder (main-scanning-direction recording position detecting means) 22 for outputting A-phase pulses Pa and Z-phase pulses Pz which represent recording position information in the main scanning direction X.

The rotary encoder 22 outputs 5000 pulses per revolution of the drum 20 as A-phase pulses Pa. The rotary encoder 22 outputs one pulse per revolution of the drum 20 as a Z-phase pulse Pz. Therefore, the rotary encoder 22 for generating Z-phase pulses Pz functions as one-revolution information detecting means for detecting information (home-position information) per revolution of the drum 20.

A driven pulley 24 is mounted on the other end of the shaft of the drum 20. The driven pulley 24 is operatively coupled by a belt 28 to a rotatable shaft 30 of a main scanning motor (rotational drive source) 26 which is mounted on the base 16. The main scanning motor 26 may comprise an AC servomotor, for example.

When the rotatable shaft 30 of the main scanning motor 26 rotates as a drive pulley, the belt 28 causes the driven pulley 24 and the drum 20 to rotate in the main scanning direction X.

An auxiliary scanning motor 32 is fixed to the base 16 and has a rotatable shaft connected directly or by gears to a ball screw 34 which is rotatably mounted on the base 16 parallel to the axis of the drum 20. An exposure head (recording head) 36 is threaded over the ball screw 34.

The exposure head 36 is slidable on rails 38 mounted on the base 16 parallel to the ball screw 34 in the auxiliary scanning direction indicated by the arrow Y, which is substantially perpendicular to the main scanning direction X.

When the auxiliary scanning motor 32 is energized, the balls screw 34 rotates about its own axis, moving the exposure head 36 along the rails 38 in the auxiliary scanning direction Y or its opposite direction.

A home-position detector (home-position detecting means) 39 such as a photointerruptor or the like is disposed in the home position of the exposure head 36 in the auxiliary scanning direction Y. The home-position detector 39 supplies a home-position signal to a CPU (Central Processing Unit) circuit 52 when the exposure head 36 reaches the home position thereof.

A printing plate (also referred to as a recording sheet) 42 which is made of a photosensitive material for recording an image thereon is mounted on the drum 20. The printing plate 42 may comprise a direct plate (for use in CTP (computer to plate) applications), for example.

Actually, the printing plate 42 is wound around the outer circumferential surface 40 of the drum 20, and held intimately against the outer circumferential surface 40 by holders, not shown.

The recording mechanism 12 is basically constructed as described above.

A basic arrangement of the controller 14 will now be described below. A-phase pulses Pa and Z-phase pulses Pz which are generated by the rotary encoder 22 mounted on the shaft of the drum 20 are supplied to a synchronization control circuit 50 of the controller 14. The A-phase pulses Pa and Z-phase pulses Pz are also supplied via the synchronization control circuit 50 to the CPU circuit 52.

Figure 2:
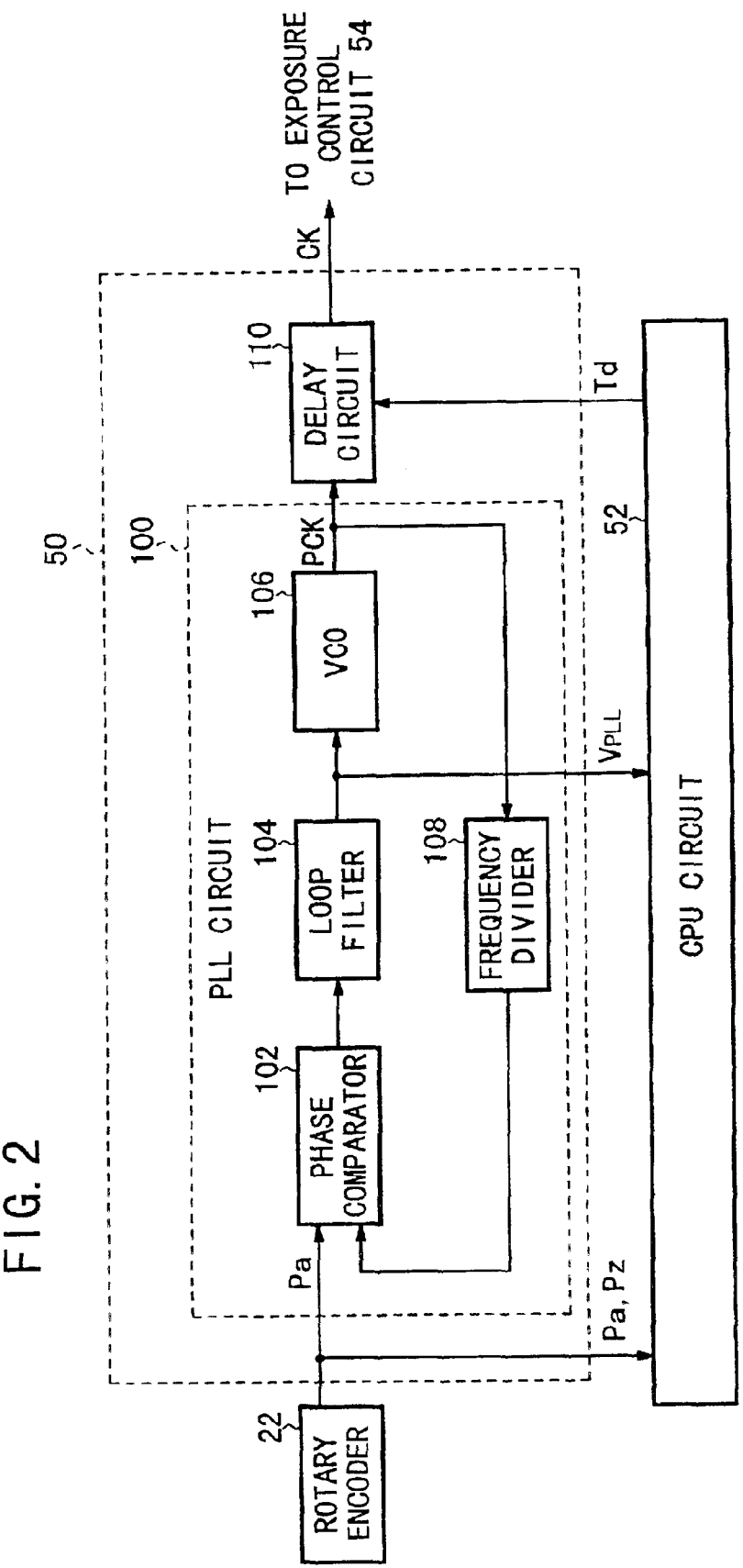
FIG. 2 is a block diagram of a synchronization control circuit shown in FIG. 1.

As shown in FIG. 2, the synchronization control circuit 50 has a PLL (Phase-Locked Loop) circuit 100. As well known in the art, the PLL circuit 100 comprises a phase comparator 102, a loop filter 104, a VCO (Voltage-Controlled Oscillator) 106, and a frequency divider 108. The phase comparator 102 compares A-phase pulses Pa supplied from the rotary encoder 22 with frequency-divided pulses supplied from the frequency divider 108, and supplies an error voltage to the loop filter 104. The loop filter 104 smoothens the error voltage and supplies the smoothened error voltage to the VCO 106. The VCO 106 generates pulses having a frequency depending on the supplied smoothened error voltage as an original clock signal PCK. The original clock signal PCK is frequency-divided into a frequency-divided signal by the frequency divider 108.

A delay $t_{PLL}$ caused by the PLL circuit 100 (also referred to as "PLL delay" or "PLL delay time") can in principle be measured by converting the output voltage $V_{PLL}$ of the loop filter 104 (also referred to as "PLL delay voltage") into a time-dependent rate of change with the CPU circuit 52. However, because the burden on the CPU circuit 52 is large, such an approach is not practical primarily from the standpoint of cost.

Figure 8:
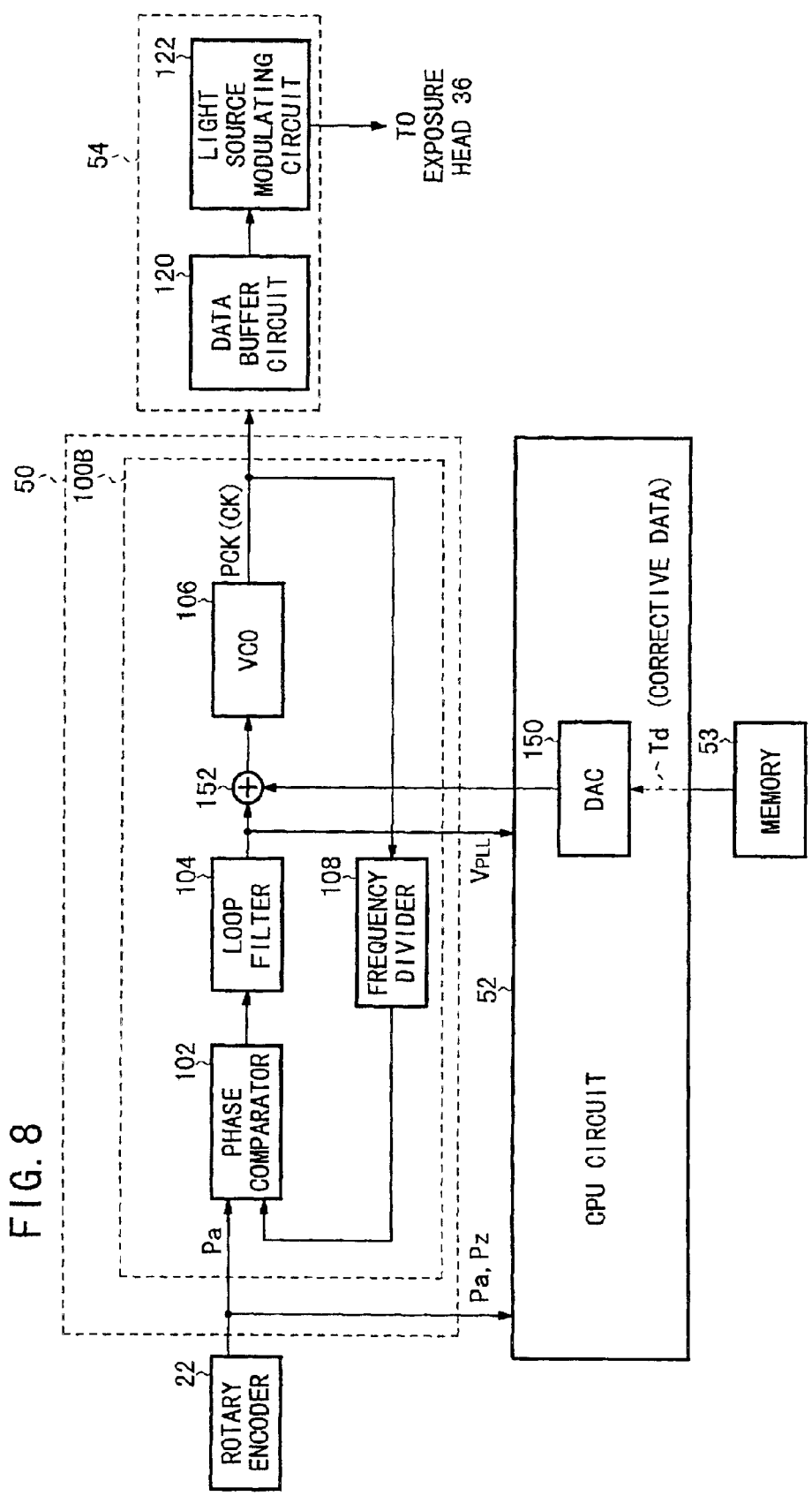
FIG. 8 is a diagram of still another exposure control system.

Actually, while the PLL circuit 100 is being left uncorrected (a corrective quantity supplied from the CPU circuit 52 to a delay circuit 110 shown in FIG. 2 or an adding circuit (adder) 152 shown in FIG. 8 is nil) and an auxiliary scanning speed, described later on, is being left uncorrected, reference data corresponding to a chart of square 1-cm grids (hereinafter referred to as "square grid chart") drawn with a line that is 20 μm thick are used as image data Di, to be described later on, to record (plot) a measuring chart on the recording sheet 42. Then, a distortion of crossing points of the plotted chart is measured highly accurately by a three-dimensional measuring unit or the like, for thereby measuring the delay $t_{PLL}$ and an auxiliary scanning deviation with the PLL circuit 100 and the auxiliary scanning speed being uncorrected.

Next, corrective quantities (a main scanning corrective quantity and an auxiliary scanning corrective quantity) for eliminating the difference between the distortion and the original value (square 1-cm grids) are determined, and reflected in the image data Di, after which a measuring chart is outputted again. The corrected results are measured again and confirmed.

If the accuracy of the confirmed corrected results is not sufficient, then the above measuring and correcting process is repeated until the sufficient level of accuracy is achieved.

It is to be noted that since the rotary encoder 22 is connected to the drum 20, the rotational speed and angular position of the drum 20 can be recognized from A-phase pulses Pa and Z-phase pulses Pz produced by the rotary encoder 22.

Specifically, instructions to start an exposure cycle in an accelerating process and finish an exposure cycle in a decelerating process may be generated by detecting the rotational speed of the drum 20 based on A-phase pulses Pa and Z-phase pulses Pz produced by the rotary encoder 22.

The delay of the PLL circuit 100 is problematic in that it tends to cause a shift in the timing of an image signal (light beam) in the main scanning direction X when an image is actually recorded based on the image signal.

In order to correct a shift in the timing of the original clock signal PCK outputted from the PLL circuit 100, the CPU circuit 52 applies a given delay (delay time) Td to the original clock signal PCK via the delay circuit 110, thereby generating a main scanning write clock signal (pixel clock signal) CK, which is supplied as a recording synchronizing signal to the exposure control circuit 54.

The CPU circuit 52 comprises a microcomputer or the like, and has a CPU, a ROM (Read-Only Memory), a RAM (Random-Access Memory), an A/D (Analog-to-Digital) converter, a D/A (Digital-to-Analog) converter, a timer as a time measuring means, and other interfaces.

As shown in FIG. 1, a memory (corrective memory) 53 such as a hard disk or the like, which serves as a memory means for storing various corrective data, etc., described later on, is connected to the CPU circuit 52. The corrective data are supplied to and stored in the memory 53 from a host computer 126 via the CPU circuit 52.

Figure 3:
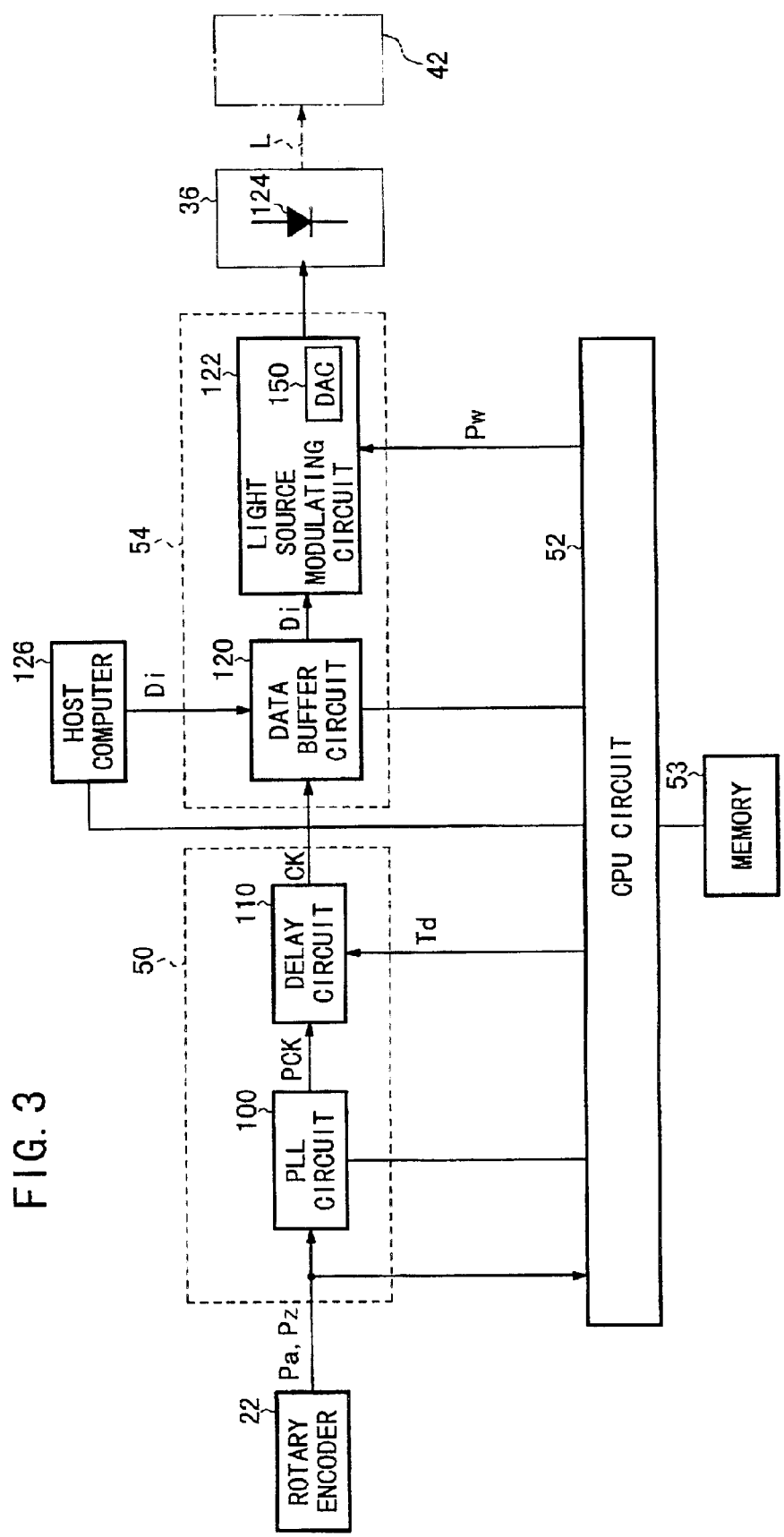
FIG. 3 is a block diagram of an exposure control system.

As shown in FIG. 3, the exposure control circuit 54 comprises a data buffer circuit 120 as an image data memory means which uses the pixel clock signal CK as a readout signal and a light source modulating circuit 122 for energizing a laser diode 124 which is a light source in the exposure head 36 based on image data Di outputted from the data buffer circuit 120.

The image data Di, which is halftone-dot image data, for example, to be recorded on the printing plate 42, is written from the host computer 126 into the data buffer circuit 120.

The image data Di, i.e., binary data having a value "0" or "1", is outputted from the data buffer circuit 120 based on the image clock signal CK, used as a readout signal, which is outputted from the delay circuit 110 of the synchronization control circuit 50. The outputted image data Di are supplied to the light source modulating circuit 122, which supplies an on/off signal corresponding to the image data Di to the laser diode 124 of the exposure head 36.

The laser diode 124 applies a laser beam L that is turned on and off depending on the image data Di to the printing plate 42. For example, when the image data Di is of the value "1", the laser oscillation is energized and the laser beam L is turned on, and when the image data Di is of the value "0", the laser oscillation is de-energized and the laser beam L is turned off.

The light source modulating circuit 122 may be integrally combined with the laser diode 124, and incorporated in the exposure head 36.

As shown in FIG. 1, the auxiliary scanning motor 32 is controlled for its rotation by the CPU circuit 52 via an auxiliary scanning motor control circuit 56, and the main scanning motor 26 is controlled for its rotation by the CPU circuit 52 via a main scanning motor control circuit 58.

The auxiliary scanning motor control circuit 56 controls the auxiliary scanning motor 36 to move the exposure head 36 stepwise in the auxiliary scanning direction Y according to a speed control process to be described later on. When A-phase pulses Pa are supplied from the rotary encoder 22 via the synchronization control circuit 50 to the CPU circuit 52, the CPU circuit 52 calculates a speed corresponding to the number of A-phase pulses Pa per unit time, i.e., an actual drum rotational speed, and controls the main scanning motor control circuit 58 to rotate the main scanning motor 26. The rotation of the main scanning motor 26 is transmitted through the rotatable shaft 30, the belt 28, and the driven pulley 24 to the drum 20, thereby rotating the printing plate 42 that is held on the outer circumferential surface 40 of the drum 20.

The printing plate 42 held on the outer circumferential surface 40 of the drum 20 which is thus rotated by the main scanning motor 26 is scanned by the laser beam L outputted from the exposure head 36, which serves as an image recording means, in the main scanning direction X that is perpendicular to the axis of the drum 20. At the same time, the exposure head 36 is moved in the auxiliary scanning direction Y along the axis of the drum 20 that is perpendicular to the main scanning direction X, by the auxiliary scanning motor 32, which serves as an auxiliary scanning direction moving means, thus forming a two-dimensional image on the printing plate 42.

The controller 14 is constructed of the synchronization control circuit 50, the exposure control circuit 54, the auxiliary scanning motor control circuit 56, the main scanning motor control circuit 58, and the CPU circuit 52 which control these circuits.

Basically, the light beam image recording apparatus 10 according to the above embodiment of the present invention is constructed and operates as described above.

The principles of the present invention as related to the above embodiment will be described below.

Figure 4A:
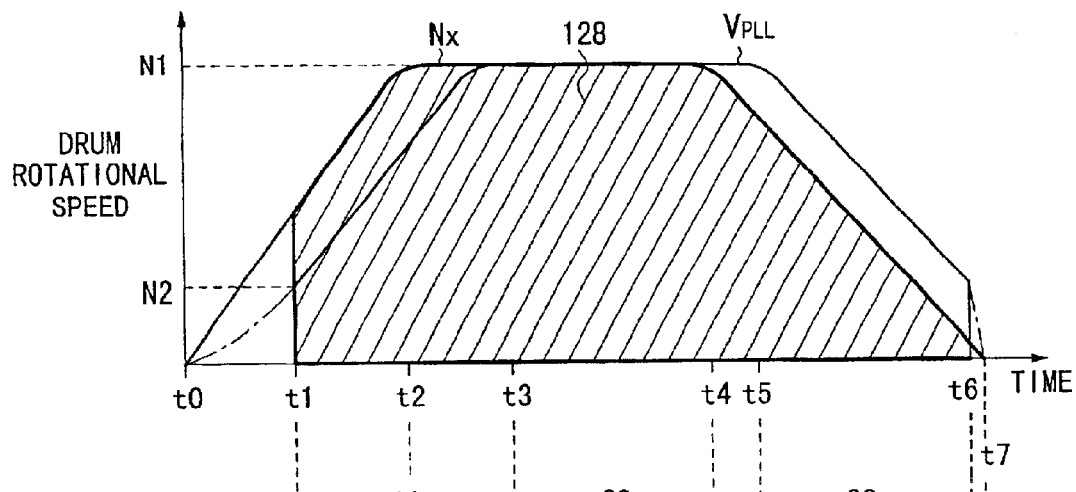
FIG. 4A is a diagram showing rotational speeds of a drum.

FIG. 4A shows the actual rotational speed Nx (indicated by the thick solid-line curve) of the drum 20 (referred to as "actual drum rotational speed" representing an actual rotation/position signal) which is rotated based on a command value Ni (not shown in FIG. 4A) of the rotational speed rpm of the drum 20 (referred to as "drum rotational speed command value") which is given from the CPU circuit 52 to the main scanning motor control circuit 58. In FIG. 4A, the actual drum rotational speed Nx is indicated by the solid-line curve in a substantially trapezoidal shape.

Actually, the actual drum rotational speed Nx is detected by the rotary encoder 22 with a certain delay occurring behind the drum rotational speed command value Ni, and the original clock signal PCK is generated by the PLL circuit 100 with a certain delay occurring behind the actual drum rotational speed Nx in the PLL circuit 100. The actual drum rotational speed Nx increases from a time t0 (Nx=0), becomes equal to a normal rotational speed N1 (Nx=N1) at a time t2, starts decreasing at a time t4, and becomes nil at a time t7 when the drum 20 stops its rotation.

In FIG. 4A, the thin solid-line curve indicates the PLL delay voltage $V_{PLL}$ (the output of the loop filter 104 in FIG. 2) as standardized by the normal rotational speed N1. As shown in FIG. 4A, the PLL delay voltage $V_{PLL}$ lags behind the actual drum rotational speed Nx. In FIG. 4A, the PLL delay voltage $V_{PLL}$ is shown exaggerated in its delay from the actual drum rotational speed Nx, but does not actually lag behind the actual drum rotational speed Nx to the extent shown.

The actual drum rotational speed Nx can be obtained by measuring the period of A-phase pulses Pa outputted from the rotary encoder 22 with the CPU circuit 52.

A period (from the time t0 to the time t3) from the acceleration of the drum 20 from a stop until the PLL delay voltage $V_{PLL}$ reaches a level corresponding to the normal rotational speed N1 is referred to as "accelerating period". A period (from the time t3 to the time t4) after the PLL delay voltage $V_{PLL}$ has reached the level corresponding to the normal rotational speed N1 until the actual drum rotational speed Nx starts being lowered is referred to as "constant-rotational-speed period CS". A period (from the time t4 to the time t7) after the actual drum rotational speed Nx starts being lowered until the drum 20 is decelerated to a stop is referred to as "decelerating period".

Of the accelerating period from the time t0 to the time t3, an accelerating period from the time t1 to the time t3 is referred to as "accelerating period AS". Of the decelerating period from the time t4 to the time t7, a decelerating period from the time t4 to the time t6 is referred to as "decelerating period SS".

Heretofore, the exposure head 36 applies the laser beam to the printing plate 42 to record an image thereon only from the time t3 to the time t4, i.e., in the constant-rotational-speed period CS, in which the actual drum rotational speed Nx is stable and the PLL delay voltage $V_{PLL}$ is stable and constant.

According to the present invention, in order to increase the productivity, or specifically in order to shorten the total recording time, the printing plate 42 is exposed to the laser beam L for recording an image thereon in the accelerating period AS and the decelerating period SS as well as in the constant-rotational-speed period CS, as indicated by a hatched area (exposure recording area) 128 in FIG. 4A.

As can be understood from the actual drum rotational speed Nx shown in FIG. 4A, the rotational speed of the main scanning motor 26 changes greatly in an accelerating area including the accelerating period AS and a decelerating area including the decelerating period SS. Usually (as is the case with the conventional arrangement), at the constant-rotational-speed period CS, the original clock signal PCK which is phase-locked by the PLL circuit 100 with A-phase pulses Pa outputted from the rotary encoder 22 as a detected rotation signal of the main scanning motor 26 is directly used as the pixel clock signal CK which serves as a recording timing signal.

In a period where the rate of change of the period of A-phase pulses Pa is large, such as the accelerating period AS or the decelerating period SS, the PLL circuit 100 suffers a large phase-lock error as indicated by the PLL delay voltage $V_{PLL}$ in FIG. 4A.

If the original clock signal PCK were used as the image clock signal CK in the entire hatched area 128 in FIG. 4A, the image formed on the printing plate 42 would suffer irregularities (expanded and contracted regions). If the auxiliary scanning motor 32 were energized at a constant speed, then the image on the printing plate 42 would also suffer irregularities (expanded and contracted regions) in the auxiliary scanning direction Y. If the amount of the laser beam L emitted from the laser diode 124 were constant, then the image on the printing plate 42 would further suffer density irregularities.

In the accelerating period AS from the time t1 to the time t3 or the decelerating period SS from the time t4 to the time t6, therefore, it is necessary to appropriately control the position of the image to which the printing plate 42 is exposed, i.e., the position of the exposure head 36, and the amount of exposure, i.e., the amount of the laser beam L.

To control the above parameters, a recording start speed N2 in the accelerating period AS is determined in advance. As can be seen from the curve of the PLL delay voltage $V_{PLL}$ shown in FIG. 4A, the recording start speed N2 is set to a rotational speed at the time t1 when the curve of the PLL delay voltage $V_{PLL}$ is of a substantially constant gradient. Actually, in the period from the time t0 to the time t1, the PLL circuit 100 does not perform a normal phase-lock process, but is in an unstable state.

The ratio (N2/N1) of the recording start speed N2 to a maximum rotational speed N1 which is a normal recording speed is in the range of about 80 to 85%. This ratio varies dependent on how the light beam image recording apparatus 10 is designed. Consequently, it is possible to set the recording start speed N2 to about 50% or less of the normal recording speed depending on the design of the light beam image recording apparatus 10. A recording end speed N3 at the time t6 should preferably be equal to the recording start speed N2. In the present embodiment, the recording end speed N3 is equal to the recording start speed N2.

Figure 4B:
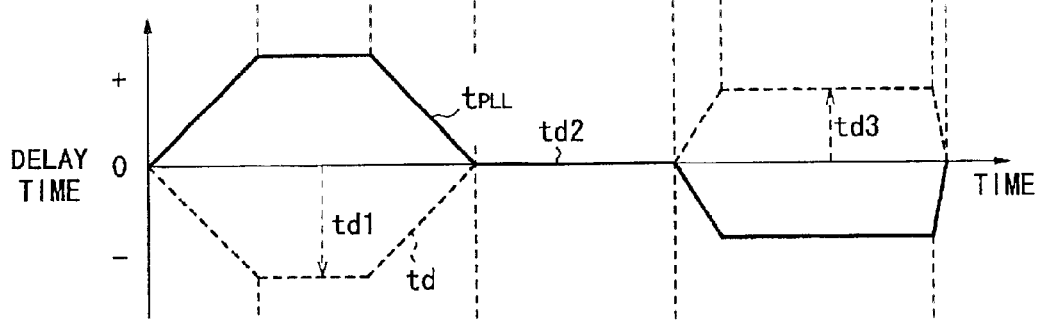
FIG. 4B is a diagram showing delay times of a PLL circuit and their correction.

FIG. 4B shows the PLL delay time $t_{pLL}$ which is a time-dependent change of the PLL delay voltage $V_{PLL}$.

In the period (from the time t0 to the time t1) where the PLL delay voltage $V_{PLL}$ changes in a positive direction from the stopped state of the drum, the PLL delay time $t_{PLL}$ increases continuously. When the PLL delay time $t_{PLL}$ reaches a value corresponding to the recording start speed N2 at the time t1, since the rate of change of the PLL delay time $t_{PLL}$ becomes constant, the PLL delay time $t_{PLL}$ is of a constant value as shown in FIG. 4B.

From the time t2 when the actual drum rotational speed Nx changes from the accelerating state to the constant-speed state, the PLL delay time $t_{PLL}$ is progressively shortened. Near the time t3 when the PLL delay voltage $V_{PLL}$ reaches a value corresponding to the constant level of the normal rotational speed N1, the PLL delay time $t_{PLL}$ becomes nearly nil. That is, the phase difference between both the input signals applied to the phase comparator 102 is substantially nil. Precisely, however, since the PLL circuit 100 is not ideal, there is a delay time between the time t3 and the time t4 which is a certain small time (positive delay time) determined by the design specifications of the PLL circuit 100.

From the time t4 when the actual drum rotational speed Nx changes from the constant-speed state to the decelerating state, the PLL delay time $t_{PLL}$ progressively increases negatively. In a period (from the time t5 to the time t6) where the rate of reduction of the PLL delay voltage $V_{PLL}$ is substantially constant, the PLL delay time $t_{PLL}$ is of a certain negative value.

Finally, after the time t6 when the PLL delay voltage $V_{PLL}$ is of a value near the recording start speed N2, the PLL circuit 100 does not perform a normal phase-lock process, and the PLL delay time $t_{PLL}$ quickly approaches the zero value. The PLL delay time $t_{PLL}$ becomes nil at a time t7 when the actual drum rotational speed Nx is nil.

According to the present invention, in the accelerating period AS, the exposure head 36 starts applying the laser beam L to the printing plate 42 to record an image thereon from the time t1 when the actual drum rotational speed Nx detected by the CPU circuit 52 via the rotary encoder 22 and the PLL circuit 100. In order to correct the PLL delay time $t_{PLL}$ at the time t1, the delay circuit 110, which may be a programmable delay circuit or the like, is inserted between the PLL circuit 100 and the exposure control circuit 54 as shown in FIG. 2.

The delay circuit 110 has a delay time td which is set to compensate for the PLL delay time $t_{PLL}$, i.e., to make nil the sum of the PLL delay time $t_{PLL}$ and the delay time td, as indicated by the broken-line curved in FIG. 4B.

However, since it is difficult to make the delay time negative, i.e., to advance the phase of the PLL circuit 100, in view of the circuit arrangement, in order to actually correct the delay time with the PLL circuit 100, an offset time (corrective delay time data) Td2 is given in each of the accelerating period AS, the constant-rotational-speed period CS, and the decelerating period SS, thereby making positive the delay time in each of the accelerating period AS, the constant-rotational-speed period CS, and the decelerating period SS. The delay time td to which the offset time Td2 is added is referred to as a corrective delay time (corrective delay time data) Td.

Figure 4C:
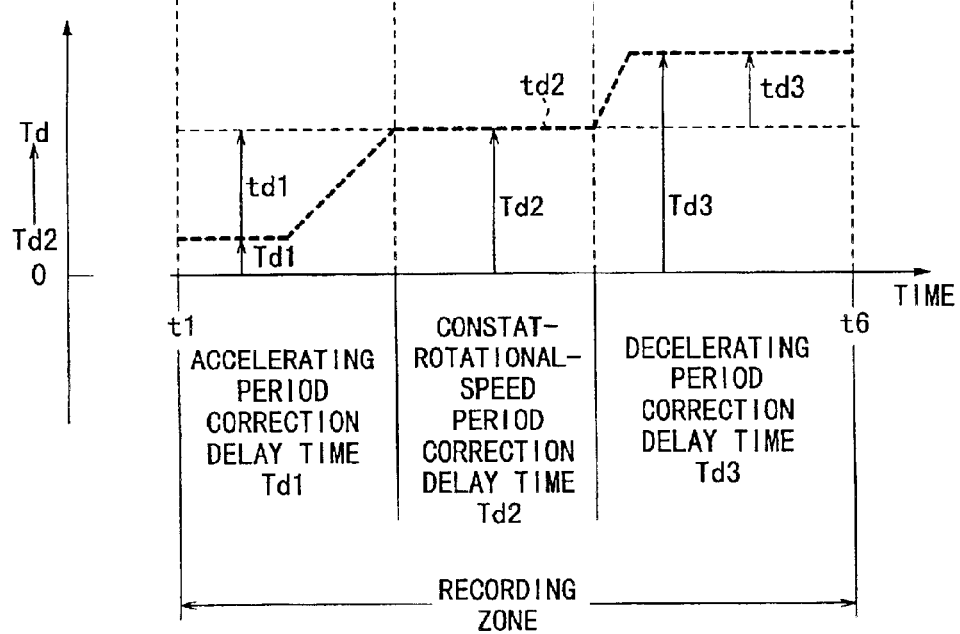
FIG. 4C is a diagram showing actual corrective data for the delay times of the PLL circuit.

In reality, the sum of a delay time td1 (negative value) between the time t1 and the time t3 shown in FIG. 4B and the offset time Td2 (positive value) is equal to a corrective delay time Td1 (positive value) shown in FIG. 4C, and the sum of a delay time td3 (positive value) between the time t4 and the time t6 shown in FIG. 4B and the offset time Td2 (positive value) is equal to a corrective delay time Td3 shown in FIG. 4C.

Therefore, between the time t3 and the time t4, the offset time Td2 is given to the delay circuit 110.

The characteristics to the delay time td are measured and calculated in advance as basic data at the time the square grid chart as described above, and stored as data (basic data) "td1–td2–td3" corresponding to addresses Ada through Adb, as indicated in a memory map of the memory 53 in FIG. 5. A storage area of the memory 53 which is indicated by the addresses Ada through Adb is referred to as a basic delay time data storage area 53a.

A zone from the time t1 to the time t6 shown in FIG. 4C is a recording zone (plotting zone) in which an image is recorded on the printing plate 42. Actually, when the delay time td as basic data is recorded as the corrective delay time data Td in another given area of the memory 53, since the recording zone corresponds to the number of main scanning lines depending on the image size and resolution in the auxiliary scanning direction Y, the characteristics of the delay time td stored in the basic delay time data storage area 53a of the memory 53 are developed and stored in another storage area of the memory 53 such that the address is updated by a Z-phase pulse Pz that is outputted from the rotary encoder 22 per revolution of the drum 20. To be more precise, the data may be stored such that the address is updated by an A-phase pulse Pa or a given count of A-phase pulses Pa.

In the present embodiment, corrective data "Td1–Td2" are stored in an accelerating period corrective delay time storage area 53b of addresses ADc through ADd shown in FIG. 5, and corrective data "Td2–Td3" are stored in a decelerating period corrective delay time storage area 53c of addresses ADe through ADf. The values of the corrective delay time data Td1, Td3 progressively increase respectively between the time t2 and the time t3 and between the time t4 and the time t5.

The deceleration start time t4 relative to the decelerating period SS is determined depending on the amount of image data Di remaining in the data buffer circuit 120 at the time t4. Specifically, the deceleration start time t4 is calculated back from the amount of data that can be recorded from the deceleration start time t4 up to the time t6 when the rotational speed N2 at which an image can normally be recorded by the exposure head 36 is reached.

As shown in FIG. 8 to be described later on, the PLL circuit 100 may be a circuit taking into account a delay time (more accurately a delay time and a lead time).

As described in detail later on, the image data can be corrected in the auxiliary scanning direction Y by changing the auxiliary scanning speed of the exposure head 36 with the auxiliary scanning motor control circuit 56 depending on a change in the actual rotational speed Nx.

In the accelerating period AS and the decelerating period SS, in order to eliminate density irregularities, it is necessary that the amount of exposure of the printing plate 42 from the exposure head 36, i.e., the amount of the laser beam L, be read from the memory 53 and set in and controlled by the light source modulating circuit 122 at the same time that the PLL circuit 100 is controlled and the movement of the exposure head 36 in the auxiliary scanning direction Y is controlled.

According to the principles of the present invention as described above, the recording time (total recording time) for recording an image on the printing plate 42 can be shortened even if the main scanning motor 26 is relatively inexpensive and has a small output power capability because the image is recorded on the printing plate 42 even in the accelerating period AS and the decelerating period SS of the main scanning motor 26 and the auxiliary scanning motor 32.

In order to be able to record an image even in the accelerating period AS and the decelerating period SS, it is necessary to take into account the following three correcting processes.

According to the first correcting process, suitable recording timing is achieved even in the accelerating period AS and the decelerating period SS by the pixel clock signal CK which is produced by changing the phase of the original clock signal PCK of the PLL circuit 100 supplied from the synchronization control circuit 50 to the exposure control circuit 54, in timed relation to the PLL delay time $t_{PLL}$ which is caused by a change in the actual rotational speed Nx of the drum 20 that is rotated by the main scanning motor 26. Even in the accelerating period AS and the decelerating period SS, the given actual rotational speed Nx at which an image can be recorded is set to a value equal to or higher than the recording start speed N2 at which the overall system including the PLL circuit 100 is stable. The recording end speed N3 at the time t6 is substantially the same as the recording start speed N2.

According to the second correcting process, the amount of the laser beam L, i.e., the laser output power, is adjusted to keep the amount of exposure constant on the printing plate 42. The laser beam L is outputted from the exposure head 36 in timed relation to the PLL delay time $t_{PLL}$ which is caused by a change in the actual rotational speed Nx of the drum 20 between the time t1 and the time t6

According to the third correcting process, the auxiliary scanning speed of the exposure head 36 moved by the auxiliary scanning motor control circuit 56 and the auxiliary scanning motor 32 is adjusted in timed relation to a change in the actual rotational speed Nx of the drum 20, thus keeping the exposure pitch, i.e., the pitch between main scanning lines, constant on the printing plate 42. Up to the time t1, the exposure head 36 is moved to a recording start point in the auxiliary scanning direction Y using the home-position detector 39.

Drawbacks that will be caused if the above first through third correcting processes are not properly performed will be described below.

Drawbacks that will be caused if the first correcting process is not properly performed, i.e., if the correction of the pixel clock signal CK is not properly performed:

Heretofore, for recording an image on the printing plate 42, A-phase pulses Pa generated by the rotary encoder 22 mounted on the shaft of the drum 20 are supplied to the PLL circuit 100 and multiplied thereby to produce the original clock signal PCK which is a recording clock signal for one pixel and used as a pixel clock signal, and the laser beam L is modulated in synchronism with the pixel clock.

In the accelerating period AS of the main scanning motor 26, however, the frequency of the original clock signal PCK is increased with time. In this period, the phase of the PLL circuit 100 lags at all times as indicated by the solid-line curve in FIG. 4B. If the original clock signal PCK were used directly as the pixel clock signal, then an image would be recorded in a position ahead of the true recording position (the position where the laser beam L is applied) in the main scanning direction X.

In the decelerating period SS of the main scanning motor 26, there is caused a state which is a reverse of the above state in the accelerating period AS of the main scanning motor 26. The image thus produced would not keep its original shape, and hence would be low in shape accuracy.

Drawbacks that will be caused if the second correcting process is not properly performed, i.e., if the correction of the amount of exposure (the laser output) is not properly performed:

In a range where the actual drum rotational speed Nx is lower than the normal rotational speed N1 which is of a preset constant value, the speed at which the laser beam L scans the printing plate 42 is low. As a result, the exposure energy applied to the printing plate 42 is excessively large, resulting in the same effect as if the diameter of the laser beam L were increased. Consequently, the halftone dot percentage is increased, failing to reproduce desired density levels. When an image is recorded, obscured shadow details are produced, and when characters are recorded, the quality of the recorded characters is reduced.

Drawbacks that will be caused if the third correcting process is not properly performed, i.e., if the correction of the auxiliary scanning speed is not properly performed:

With the external-surface-scanning (outer-drum) image recording apparatus 10 shown in FIG. 1, it is necessary that the actual rotational speed Nx of the drum 20 and the auxiliary scanning speed of the exposure head 36 are at a predetermined ratio. If the auxiliary scanning speed were of a constant value when the actual rotational speed Nx of the drum 20 changes, then the scanning pitch (auxiliary scanning pitch) on the printing plate 42 in the auxiliary scanning direction Y would change from time to time, resulting in lower shape accuracy and image irregularities.

Specific examples of the first through third correcting processes for eliminating the above drawbacks will be described below.

Determination of the recording start time t1 and the deceleration start time t4 shown in FIGS. 4A through 4C.

FIG. 6 is a functional block diagram of the CPU circuit 52. The actual drum rotational speed Nx illustrated in FIG. 4A is also shown as a modified curve in FIG. 6.

After the drum 20 has started to rotate, the rate of A-phase pulses Pa outputted from the rotary encoder 22 mounted on the shaft of the drum 20 is detected by a speed detector 130. The speed detector 130 comprises a timer counter for detecting the actual drum rotational speed Nx by counting A-phase pulses Pa per unit time.

Then, a start speed comparator 132 compares the detected actual drum rotational speed Nx with the recording start speed N2 which has been measured in advance and stored in the memory 53.

When the actual drum rotational speed Nx is equal to the recording start speed N2 (Nx=N2), the start speed comparator 132 outputs a signal to cause a recording start trigger generator 134 to generate a recording start trigger Tst, which is supplied to the auxiliary scanning motor control circuit 56, the accelerating period corrective delay time storage area 53b of the memory 53, and a recorded amount integrator 136. The recording start trigger Tst functions as an enable signal, and is generated at the recording start time t1.

Subsequently, the recorded amount integrator 136 produces an integrated number of revolutions of the drum 20 by counting Z-phase pulses Pz, and sends the integrated number of revolutions of the drum 20 to a deceleration start position detector 138. The integrated number of revolutions of the drum 20 corresponds to the number of main scanning lines of an image recorded on the printing plate 42, i.e., an integrated number of main scanning lines.

Before an image starts to be recorded on the printing plate 42, the size of the image to be recorded on the printing plate 42, i.e., an output image size, has been indicated from the host computer 126 to a deceleration start time calculator 140 of the CPU circuit 52.

If an image to be recorded on the printing plate 42 is a rectangular image, then the output image size is represented by "total number (mt) of main scanning lines in the auxiliary scanning direction Y×the number (it) of pixels in the main scanning direction X".

The number of main scanning lines in the recording zone from the time t1 to the time t6 corresponds to the total number (mt) of main scanning lines. The number mss of scanning lines that can be recorded from the deceleration start time t4 to the recording end time t6 is determined by calculations.

The time required for the actual drum rotational speed Nx to be reduced from the normal rotational speed N1 to the recording end speed N3 at the recording end time t6 (N3=N2) is determined by mechanical conditions including the weight and inertial moment of the drum 20, the output power of the main scanning motor 26, the mechanical strength against acceleration of the parts mounted on the drum 20, etc. The number of revolutions of the drum 20 between the time t4 and the time t6 is determined according to the above apparatus design.

The number mss of scanning lines required in the decelerating period SS is determined by actual measurements, and hence determined when the conditions for the drum rotational speeds, i.e., the normal rotational speed N1 and the recording end speed N3 (N3=N2), are determined.

Since the normal rotational speed N1 may possibly be changed depending on resolution conditions, etc., it is necessary to measure the data of number mss of scanning lines with respect to a change in the normal rotational speed N1 as basic data at the time of designing the apparatus, and storing the basic data in the memory 53.

The accelerating and decelerating patterns correspond uniquely to the normal rotational speed N1 once the normal rotational speed N1 is determined. Since the normal rotational speed N1 is held in one-to-one correspondence to the exposure resolution in the main scanning direction X, it is possible to measure accelerating and decelerating characteristics, determine appropriate accelerating and decelerating patterns, and store them in the memory 53.

However, if a photosensitive material having such characteristics that the peripheral speed of the drum 20 and the required amount of exposure are not proportional to each other, i.e., a photosensitive material with a low-intensity reciprocity law failure, such as a recent thermal photosensitive material, is to be exposed to the laser beam L, then care should be taken to determine accelerating and decelerating patterns in view of the low-intensity reciprocity law failure of the photosensitive material.

At any rate, the result of comparison between a square grid chart produced by reading the values stored in the respective addresses of the memory 53 and moving the exposure head 36 in the auxiliary scanning direction and an ideal square grid chart should fall within a dimensional accuracy range (e.g., about ¼ pixel obtained from the results of experiments on various many types of apparatus) allowable for color printing applications. Actually, data are measured using a square grid chart, as described above.

The number mss of scanning lines that can be recorded between the time t4 and the time t6 which is calculated based on the normal rotational speed N1 from the saved data is stored in the memory 53. Therefore, the deceleration start time calculator 140 of the CPU circuit 52 can count the number of exposed scanning lines corresponding to the deceleration start time t4, i.e., the number of scanning lines from the time t1 to the time t4, and supplies the number of scanning lines (the number of main scanning lines to be recorded between the time t1 and the time t4) (mt−mss) produced by subtracting the number mss of scanning lines to be recorded in the decelerating period SS from the total number mt of main scanning lines, as a reference value to the deceleration start position detector 138.

When the deceleration start position detector 138 detects that the integrated value m supplied from the recorded amount integrator 136 is equalized to the reference value (mt−mss), the deceleration start position detector 138 supplies a detected signal to a deceleration start trigger generator 141.

The deceleration start trigger generator 141 generates and supplies a deceleration start trigger Tsp to the main scanning motor control circuit 58, and also supplies the deceleration start trigger Tsp as a readout start enable signal to the decelerating period corrective delay time storage area 53c.

The determination of the recording start time t1 and the deceleration start time t4 shown in FIGS. 4A through 4C has been described above.

The phase correction of the PLL for the readout of corrective delay time data, i.e., the phase difference correction in the main scanning direction, will be described below.

After the recording start trigger Tst is supplied as an enable signal to the accelerating period corrective delay time storage area 53b, corrective delay time data Td1 through Td2 corresponding respectively to the addresses ADc through ADd are read using Z-phase pulses Pz as a clock signal (incremental address signal), and supplied to the delay circuit 110 of the synchronization control circuit 50. The pixel clock CK is produced by giving a delay time corresponding to the corrective delay time data Td1 through Td2 to the original clock signal PCK outputted from the PLL circuit 100.

Based on the pixel clock CK, image data Di is read from the data buffer circuit 120 and supplied to the light source modulating circuit 122. The laser beam L which is modulated by the modulating output from the light source modulating circuit 122 is applied from the exposure head 36 to the printing plate 42 for thereby recording an accurate image on the printing plate 42 even in the accelerating period AS.

While an image is being recorded on the printing plate 42 by the laser beam L based on the corrective delay time data Td2 in the constant-rotational-speed period CS, when the deceleration start trigger Tsp is supplied as an enable signal to the decelerating period corrective delay time storage area 53c, corrective delay time data Td2 through Td3 corresponding respectively to the addresses ADe through ADf are read using Z-phase pulses Pz as a clock signal (incremental address signal) and are supplied to the delay circuit 110 of the synchronization control circuit 50. The pixel clock CK is produced by giving a delay time corresponding to the corrective delay time data Td2 through Td3 to the original clock signal PCK outputted from the PLL circuit 100.

Based on the pixel clock CK, image data Di is read from the data buffer circuit 120 and supplied to the light source modulating circuit 122. The laser beam L which is modulated by the modulating output from the light source modulating circuit 122 is applied from the exposure head 36 to the printing plate 42 for thereby recording an accurate image on the printing plate 42 even in the decelerating period SS.

Figure 7:
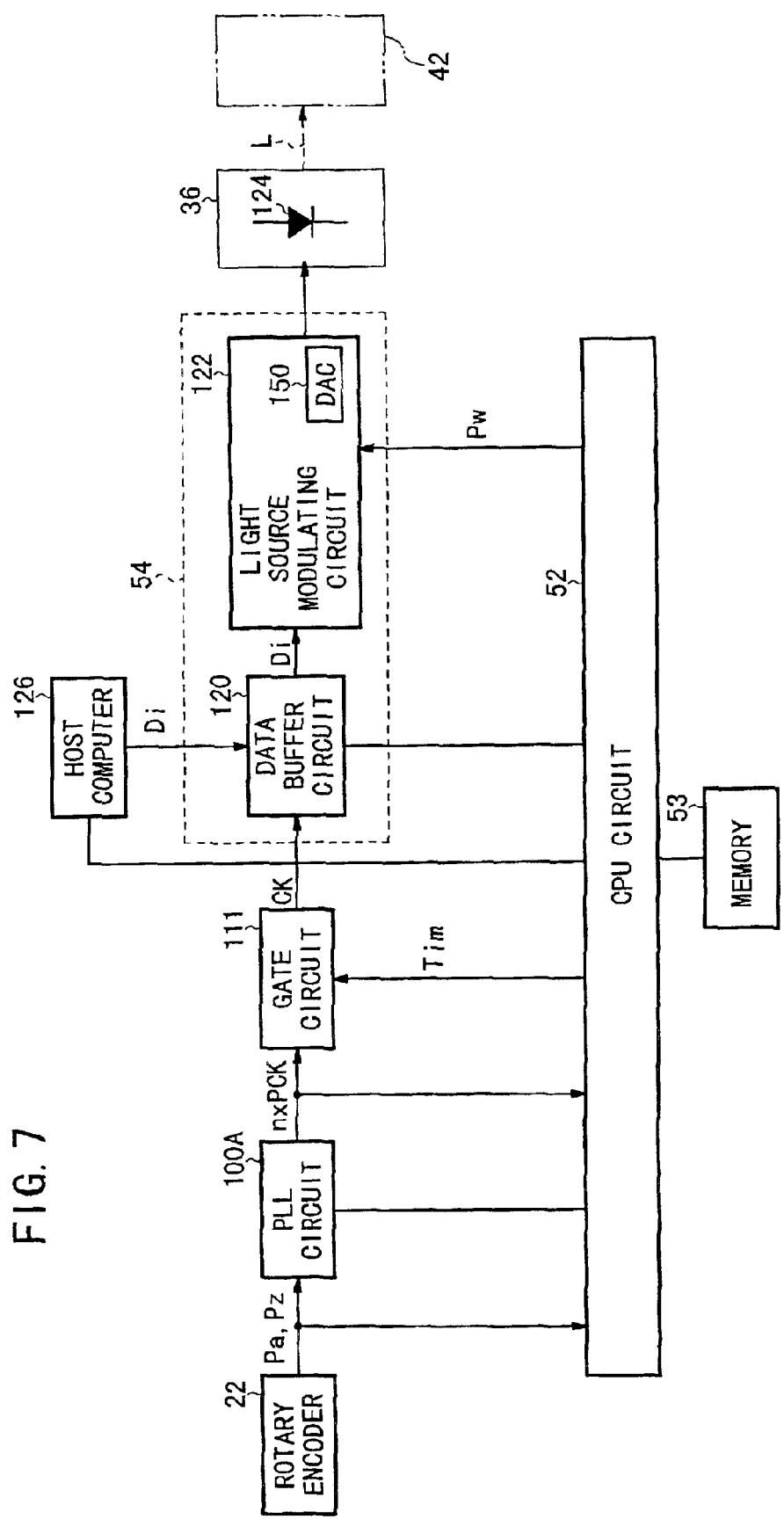
FIG. 7 is a block diagram of another exposure control system.

The phase control over the PLL circuit 100 is not limited to the dynamic digital control using the delay circuit 110 shown in FIG. 2, but may be carried out using a different system. FIG. 7 shows such an exposure control system including a PLL circuit 100A for generating an original clock signal (n×PCK) having a frequency which is n times as high as the pixel clock (image write clock) CK, and a gate circuit 111 inserted between the output terminal of the PLL circuit 100A and the exposure control circuit 54. The original clock signal (n×PCK) is supplied to the CPU circuit 52.

The CPU circuit 52 determines at which timing of the original clock signal (n×PCK) the laser diode 124 is to be energized by referring to the corrective delay time data Td1 through Td2 (the accelerating period AS), the corrective delay time data Td2 (the constant-rotational-speed period CS), and the corrective delay time data Td2 through Td3 which are stored in the memory 53, and applies a timing signal Tim corresponding to these corrective delay time data to open the gate of the gate circuit 111. The exposure control system shown in FIG. 7 thus constructed operates in the same manner as the system using the delay circuit 110.

Still another exposure control system for performing phase control over the PLL circuit 100 is shown in FIG. 8. In FIG. 8, the CPU circuit 52 has a DAC (Digital-to-Analog Converter) 150 which converts corrective delay time data Td read from the memory 53 into an analog corrective delay time signal at a constant rate, and applies the analog corrective delay time signal to an adder 152 inserted between the loop filter 104 and the VCO 106. The DAC 150 may be incorporated in a PLL circuit 100B.

The setting (correction) of the laser output will be described below.

Figure 9A:
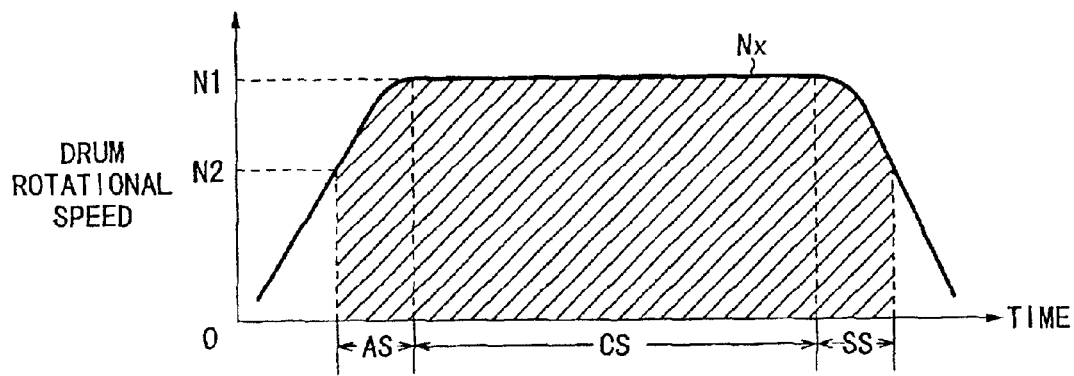
FIG. 9A is a diagram showing rotational speeds of a drum.
Figure 9B:
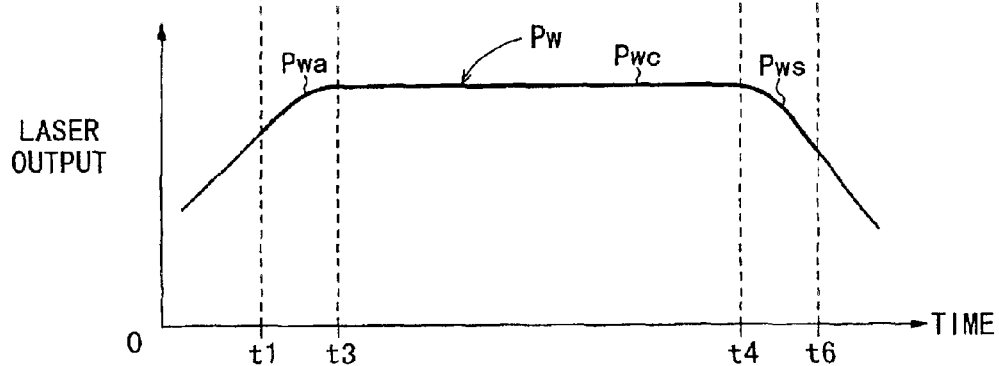
FIG. 9B is a diagram illustrating the correction of laser output levels.

As can be seen from FIG. 9A which shows the actual drum rotational speed Nx shown in FIG. 6 and FIG. 9B which illustrates the laser output (also referred to as "laser power") Pw, when the actual drum rotational speed Nx is high (between the time t3 and the time t4 shown in FIG. 9A), or stated otherwise, when the main scanning speed is high, the laser output Pw of the laser beam L emitted from the laser diode 124 is increased as shown in FIG. 9B, and when the main scanning speed is low (between the time t1 and the time t3 and between the time t4 and the time t6 in FIG. 9A), the laser output Pw of the laser beam L is lowered depending on the actual drum rotational speed Nx.

While the amount of recording on an integrated-type photosensitive material such as the printing plate 42 is proportional to the main scanning speed, it is to be taken into account that the amount of recording on a thermal photosensitive material, i.e., a threshold-type photosensitive material is not proportional to the main scanning speed.

In either case, before the corrections are made (however, the delay of the PLL circuit 100 and the auxiliary scanning speed have been corrected), a test chart of screen tint whose halftone dot percentage is 50%, or a test chart whose halftone dot percentage ranges from 0 to 100%, or a test chart of plural lines of given width extending in the main scanning direction is recorded on a recording sheet such as the printing plate 42 mounted on the drum 20 of the light beam image recording apparatus 10. The density distribution on the recording sheet is analyzed in advance to determine a laser output Pw (see FIG. 9B) required for the recording sheet, and stored as corrected laser output data Pw in a given area of the memory 53.

As shown in FIG. 9B, the corrected laser output data Pw comprises laser output data Pwa which gradually increases in the accelerating period AS between the time t1 and the time t3, constant laser output data Pwc in the constant-rotational-speed period CS between the time t3 and the time t4, and laser output data Pws which gradually decreases in the decelerating period SS between the time t4 and the time t6.

The laser output data Pw determined as shown in FIG. 9B has corrective data "Pwa-Pwc" stored in an accelerating period laser output storage area 53d of addresses ADg through ADh and corrective data "Pwc-Pws" stored in a decelerating period laser output storage area 53e of addresses ADi through ADj.

The laser output data Pw can be read in the same manner as described with reference to FIG. 6 except that the accelerating period corrective delay time storage area 53b and the decelerating period corrective delay time storage area 53c shown in FIG. 6 are replaced respectively with the accelerating period laser output storage area 53d and the decelerating period laser output storage area 53e shown in FIG. 10.

Figure 10:
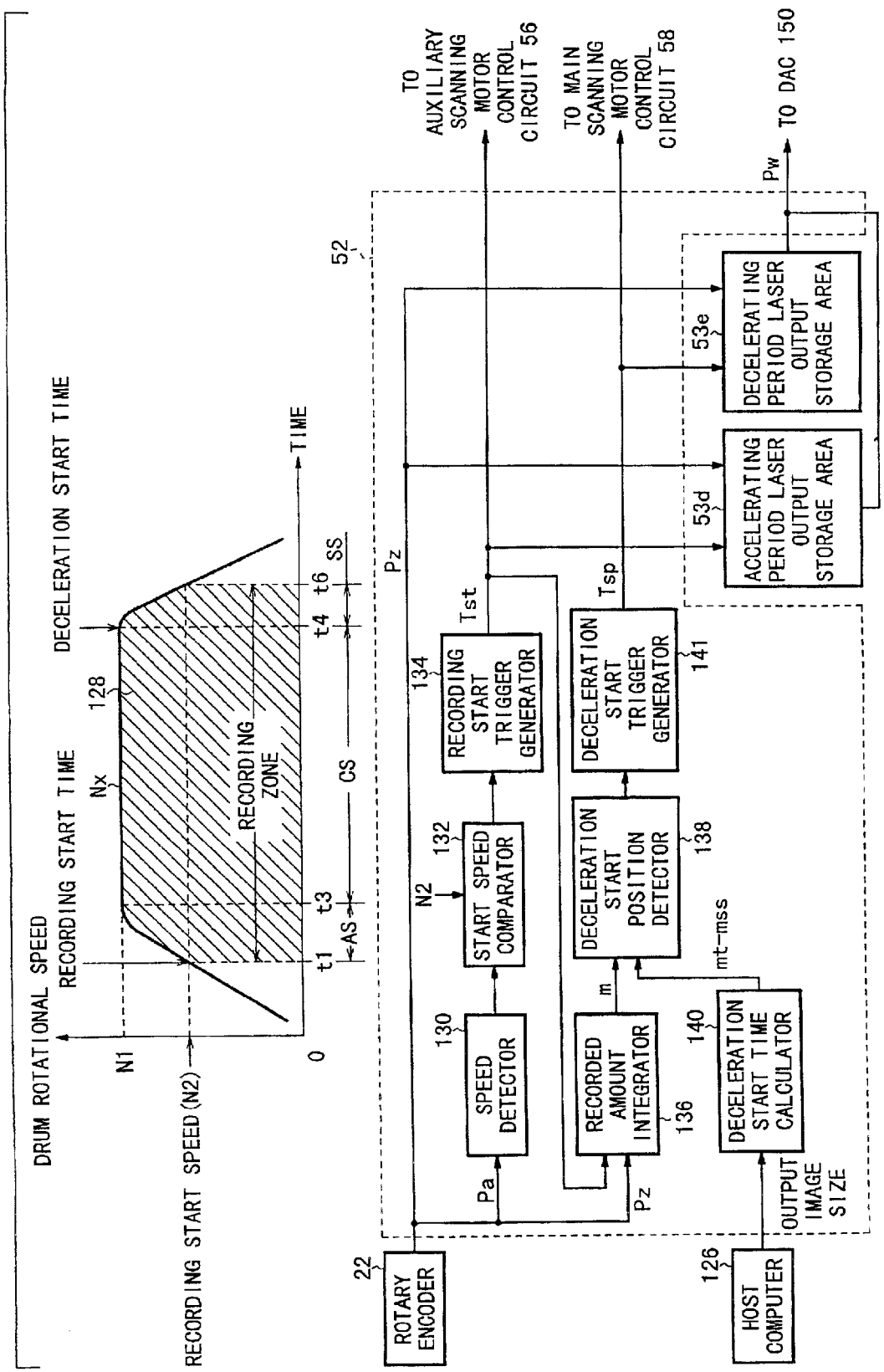
FIG. 10 is a functional block diagram illustrating the correction of laser output levels.

In FIG. 10, the laser output data Pw read from the accelerating period laser output storage area 53d and the decelerating period laser output storage area 53e are supplied from the CPU circuit 52 to the DAC 150 of the light source modulating circuit 122 (see FIGS. 3 and 7).

Figure 11:
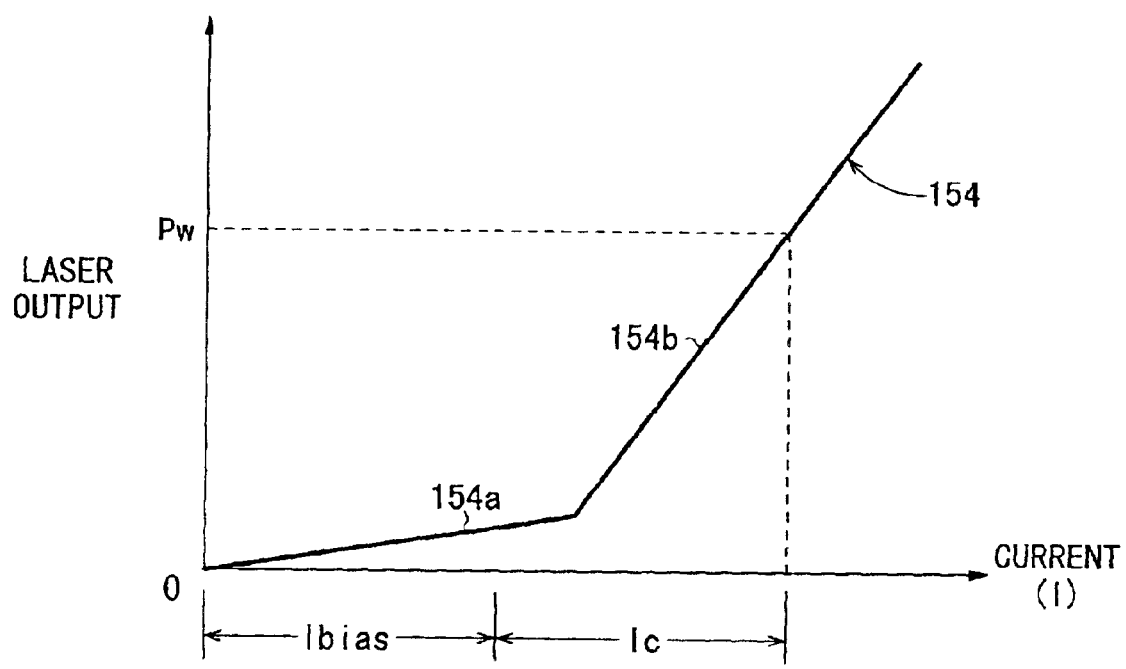
FIG. 11 is a diagram showing laser output characteristics.

FIG. 11 shows current vs. laser output characteristics (also referred to as "laser output characteristics") 154 of the laser diode 124. As well known in the art, the laser output characteristics 154 are made up of characteristics 154a in a bias region and characteristics 154b in a laser oscillation region. In FIG. 11, the horizontal axis represents a current including a current in the bias region which is referred to as a bias current Ibias and a current in both the bias region and the laser oscillating region which is referred to as a drive current Ic.

Actually, a current I for generating the laser output Pw or a voltage converted from the current I is stored in the accelerating period laser output storage area 53d and the decelerating period laser output storage area 53e which serve as a corrective memory.

Figure 12:
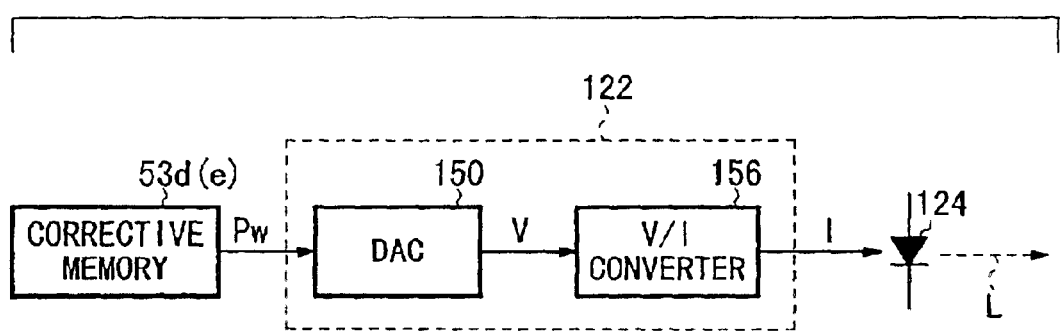
FIG. 12 is a block diagram illustrating the principles of the correction of laser output levels.

The light source modulating circuit 122 as a laser driver circuit is arranged in principle as shown in FIG. 12. In FIG. 12, the accelerating period laser output storage area 53d and the decelerating period laser output storage area 53e are referred to as a corrective memory for an easier understanding of the present invention.

Digital voltage data corresponding to laser output corrective data Pw stored in the corrective memory 53d (53e) is converted by the DAC 150 of the light source modulating circuit 122 into an analog voltage signal V, which is converted into an analog current signal I by a voltage-to-current converter (V/I converter) 156 of the light source modulating circuit 122. The analog current signal I is supplied to the laser diode 124, which applies an intensity-modulated laser beam L to the printing plate 42.

The light source modulating circuit 122 may actually be constructed in a plurality of types.

Figure 13:
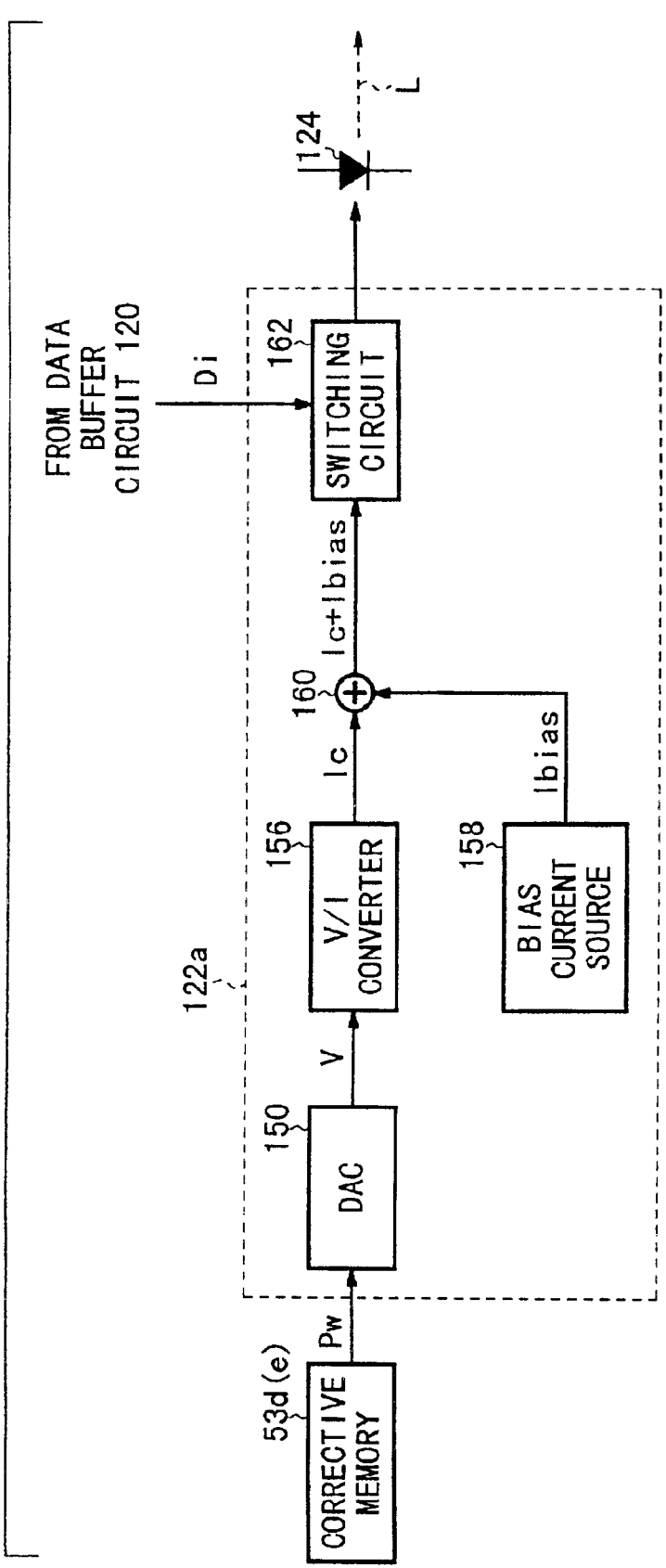
FIG. 13 is a block diagram of a circuit for correcting a laser output level by changing a drive current.

FIG. 13 shows a light source modulating circuit 122a which is connected to the corrective memory 53d (53e) for storing only the drive current Ic. The light source modulating circuit 122a has an adder 160 and a switching circuit (gate circuit) 162 which are inserted between the output terminal of the V/I converter 156 and the laser diode 124, and a bias current source 158 connected to an input terminal of the adder 160.

The switching circuit 162 has a control terminal supplied with binary image data Di as a switching signal from the data buffer circuit 120. If the image data Di is of a low level, then the switching circuit 162 is turned off, i.e., its gate is closed. If the image data Di is of a high level, then the switching circuit 162 is turned on, i.e., its gate is open.

Since the output terminal of the V/I converter 156 supplies the drive current Ic representing corrective data to the adder 160 and the bias current source 158 supplies the bias current Ibias to the adder 160, no current is supplied to the laser diode 124 when the switching circuit 162 is turned off, and a current (Ibias+Ic) is supplied to the laser diode 124 when the switching circuit 162 is turned on. When the current (Ibias+Ic) is supplied to the laser diode 124, the laser diode 124 is oscillated to emit a laser beam L having a desired laser output Pw, which is applied to the printing plate 42 that is being rotated.

Figure 14:
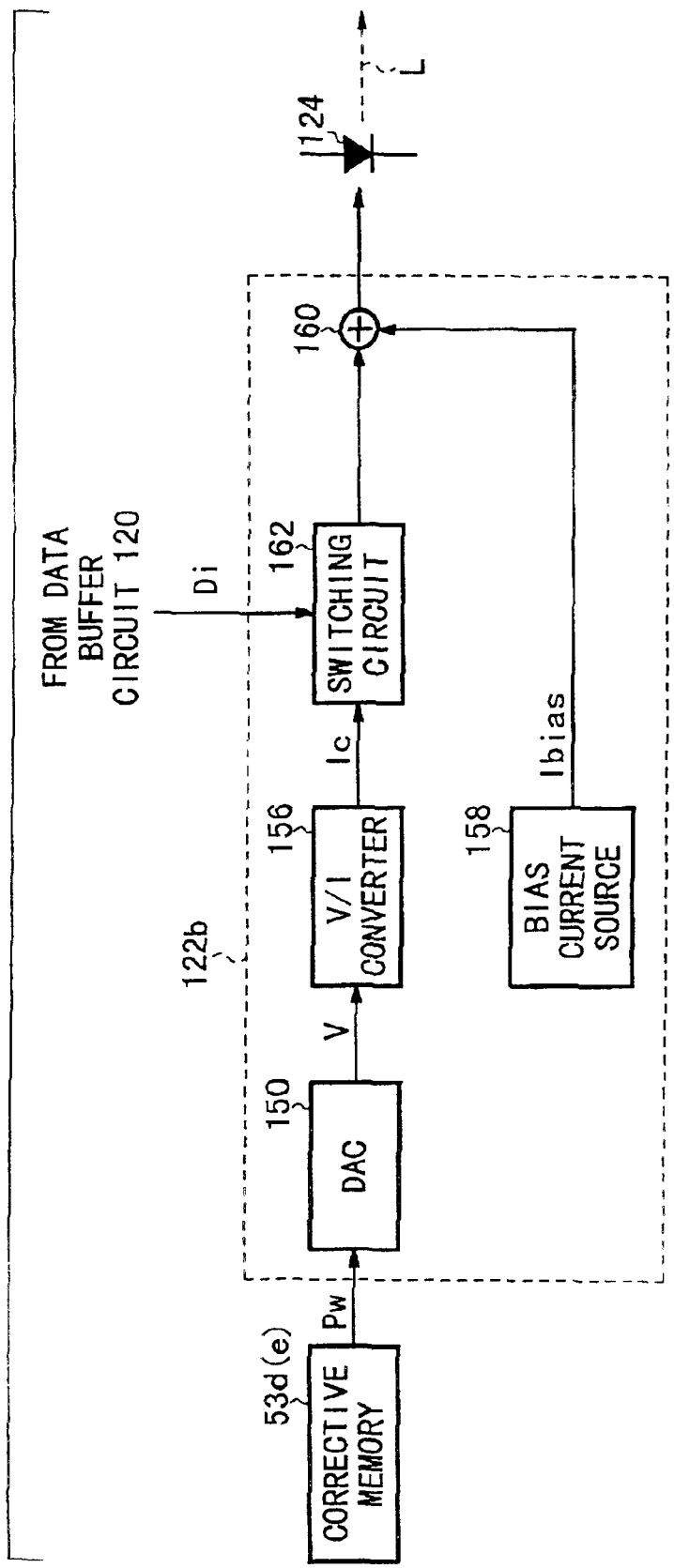
FIG. 14 is a block diagram of a circuit which is a modification of the circuit shown in FIG. 13.

FIG. 14 shows another light source modulating circuit 122b. The light source modulating circuit 122b shown in FIG. 14 differs from the light source modulating circuit 122a shown in FIG. 13 in that the adder 160 is connected to the output terminal of the switching circuit 162. With the light source modulating circuit 122b, the switching circuit 162 has a smaller dynamic range than the switching circuit 162 shown in FIG. 13.

Figure 15:
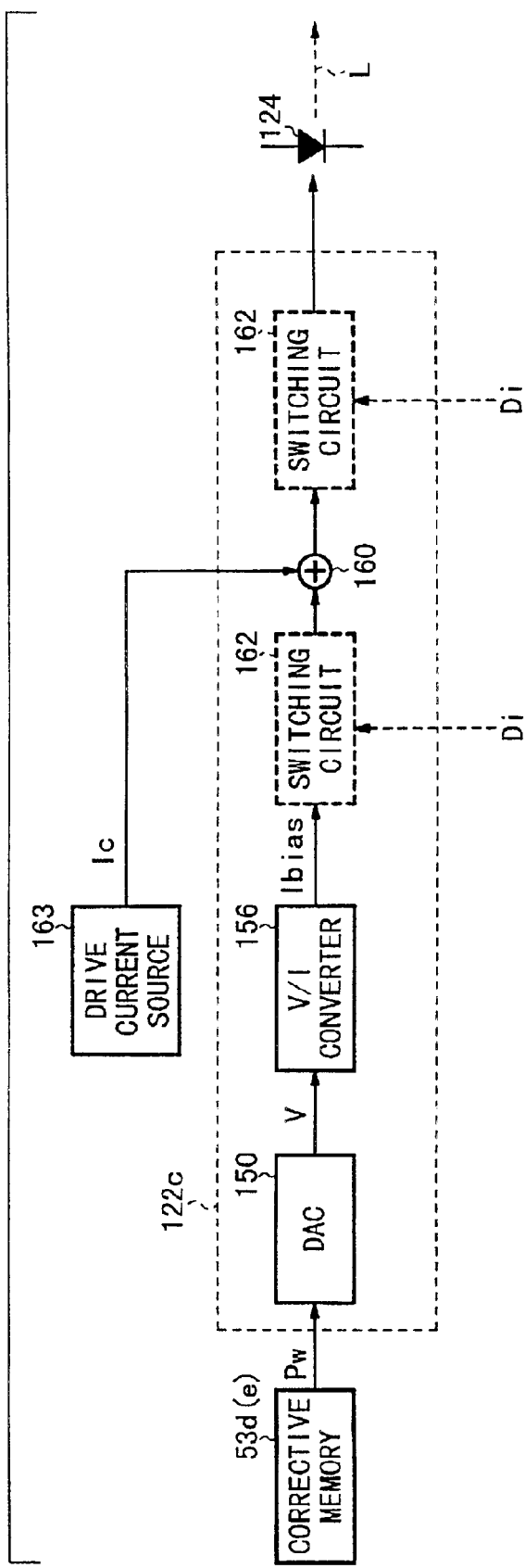
FIG. 15 is a block diagram of a circuit for correcting a laser output level by changing a bias current.

FIG. 15 shows still another light source modulating circuit 122c. In the light source modulating circuit 122c, the V/I converter 156 outputs the bias current Ibias as a corrective current, and a drive current source 163 supplies a constant drive current Ic which is added to the bias current Ibias by the adder 160. The switching circuit 162, indicated by the broken lines, may be connected between the V/I converter 156 and the adder 160 (as with the arrangement shown in FIG. 14) or between the adder 160 and the laser diode 124 (as with the arrangement shown in FIG. 13).

If a solid-state laser capable of oscillating at all times such as a helium neon laser, other than the laser diode 124, is used as the light source of the exposure head 36, then it is customary to use an acousto-optic modulator (AOM). The amount of the laser beam L can be controlled by setting the corrective amount Pw in an AOM driver circuit.

Figure 16:
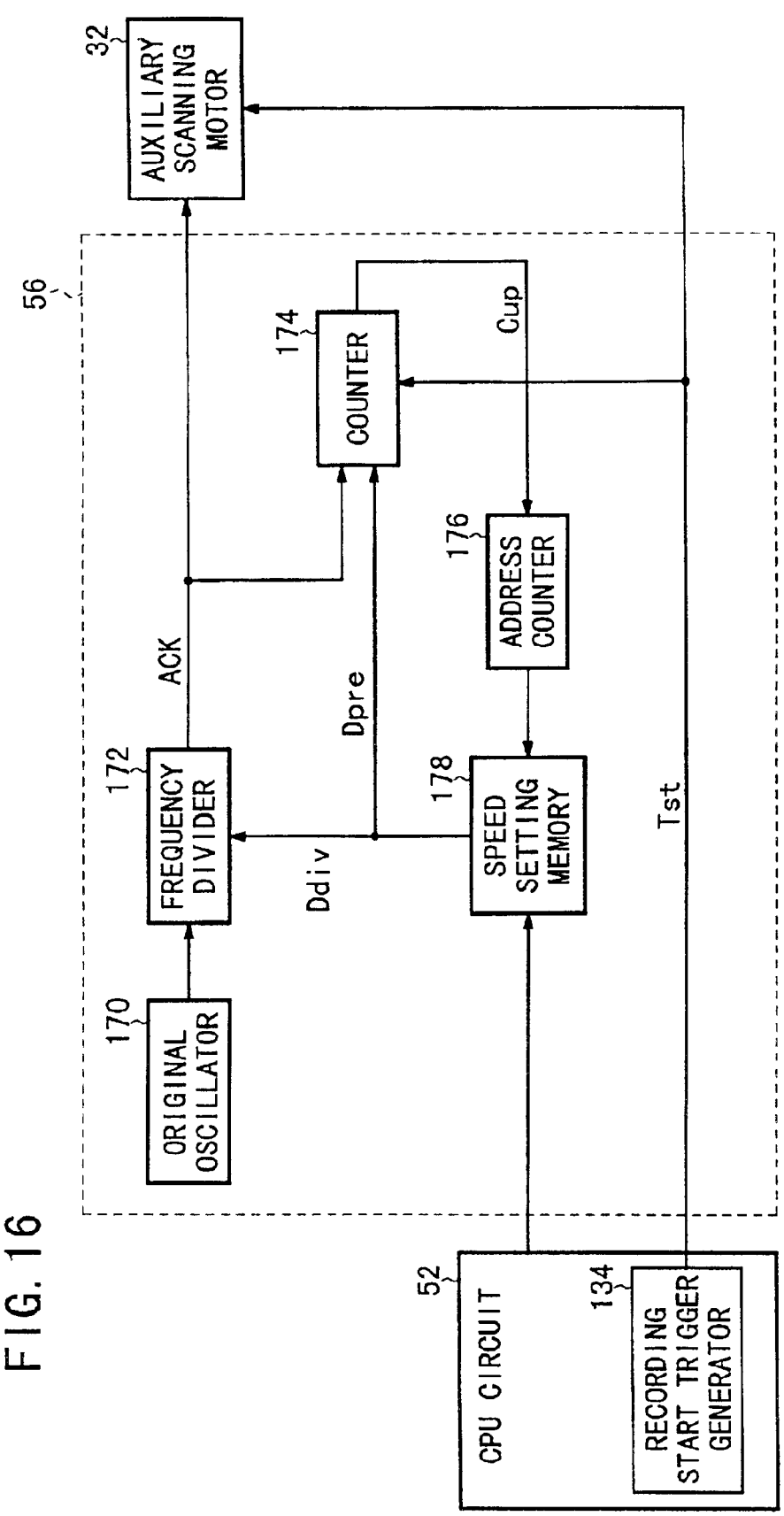
FIG. 16 is a functional block diagram illustrating an auxiliary scanning motor control circuit.

FIG. 16 shows an arrangement of the auxiliary scanning motor control circuit 56. As shown in FIG. 16, the auxiliary scanning motor control circuit 56 comprises an original oscillator 170 for oscillating at about 40 MHz, a frequency-divider 172 for frequency-dividing an original clock signal outputted from the original oscillator 170 at a frequency-dividing ratio Ddiv to generate an auxiliary scanning clock signal ACK, a counter 174 as counting means for counting pulses of the auxiliary scanning clock signal ACK to a preset value Dpre to output a counting end signal (count-up signal) Cup, an address counter 176 as memory address setting means for setting a memory readout address when supplied with the counting end signal Cup, and a speed setting memory (corrective memory) 178 for supplying a frequency-dividing ratio Ddiv and a preset value Dpre respectively to the frequency divider 172 and the counter 174 depending on an output address from the address counter 176.

The counter 174 is supplied with a recording start trigger Tst from the recording start trigger generator 134 of the CPU circuit 52. Auxiliary scanning corrective data is written in the speed setting memory 178 by the CPU circuit 52.

The auxiliary scanning motor 32 moves the exposure head 36 one step in the auxiliary scanning direction Y each time it is supplied with one pulse of the auxiliary scanning clock signal ACK. The distance that the exposure head 36 is moved in response to one pulse of the auxiliary scanning clock signal ACK is determined by the auxiliary scanning motor 32, the ball screw 34, and the speed reduction ratio of a gear train (not shown).

As shown in FIG. 17, the speed setting memory 178 stores a set of a frequency-dividing ratio Ddiv and a preset value Dpre at each leading address (in FIG. 17, there are nine leading addresses "1, 2, 3, 4, 5, 6, 7, 8, 9" for an easier understanding of the present invention). The actual values of the frequency-dividing ratio Ddiv and the preset value Dpre are calculated by the CPU 52 based on the resolution (dpi: dots per inch) of an image to be recorded in the auxiliary scanning direction Y on the printing plate 42, and the size of the image in the auxiliary scanning direction Y, and are written in the speed setting memory 178.

The speed setting memory 178 may not necessarily be a hardware memory, but may comprise a plurality of registers.

The frequency divider 172 frequency-divides original clock pulses with the frequency-dividing ratio supplied from the speed setting memory 178, generating the auxiliary scanning clock signal ACK. As the frequency-dividing ratio is greater, the frequency of the generated auxiliary scanning clock signal ACK is lower.

The counter 174 counts pulses of the auxiliary scanning clock signal ACK. When the count reaches the preset value Dpre set in a preset register of the counter 174, the counter 174 outputs the counting end signal Cup, and resets the count of the counter 174 to zero.

Each time the counting end signal Cup is supplied to the address counter 176, the address counter 176 counts up, and the speed setting memory increments its pointer by one. As a result, a next set of a new frequency-dividing ratio Ddiv and a new preset value Dpre is set in the frequency divider 172 and the counter 174.

In a standby state prior to the recording of an image on the printing plate 42, the exposure head 36 is placed under the control of the CPU circuit 52, e.g., put in the position of the home-position detector 39. The CPU circuit 52 calculates the position of an image to be recorded on the recording sheet 42 from an exposure instruction from the host computer 126, and moves the exposure head 36 to a given exposure start position.

At this time, the CPU circuit 52 determines a required preset value Dpre from the difference between the present position of the exposure head 36 and the exposure start position, and sets a speed, or stated otherwise, a frequency-dividing ratio Ddiv insofar as the exposure head 36 runs out of control, thus moving the exposure head 36 to the given exposure start position.

When the exposure head 36 is stopped, the CPU circuit 52 sets a table in the speed setting memory 178 as described above with reference to FIG. 17.

The counter 144 has an operation enable terminal connected to the recording start trigger generator 134. When a recording start trigger Tst is supplied from the recording start trigger generator 134 to the operation enable terminal of the counter 144, the counter 144 starts counting pulses of the auxiliary scanning clock signal ACK. In response to the recording start trigger Tst, the auxiliary scanning motor 32 starts receiving the auxiliary scanning clock signal ACK, or stated otherwise, starts moving the exposure head 36 in synchronism with the auxiliary scanning clock signal ACK.

Figure 18:
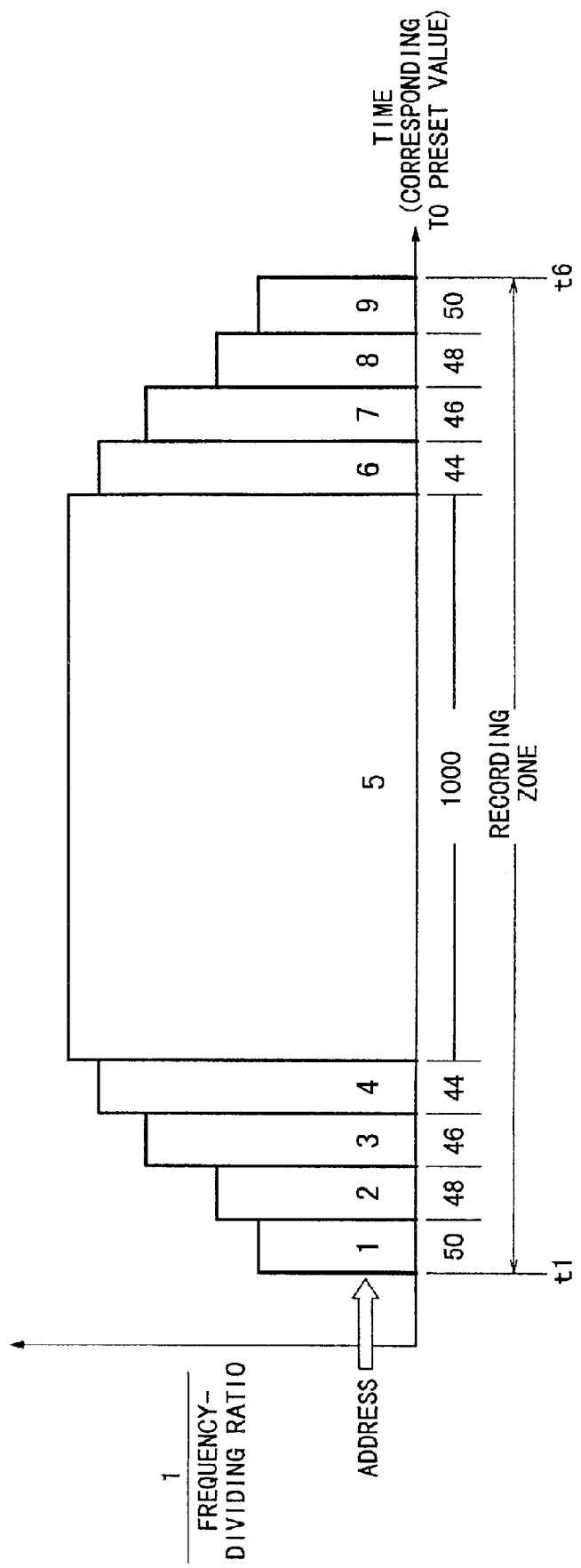
FIG. 18 is a diagram showing a correspondence between a recording zone and frequency-dividing ratios with respect to the feeding of a recording sheet in an auxiliary scanning direction.

According to the above control process, when the actual rotational speed Nx of the drum 20 has reached the recording start speed N2, as shown in FIG. 18, a frequency-dividing ratio Ddiv and a preset value Dpre are set respectively in the frequency divider 172 and the counter 174, making it possible to change the frequency of the auxiliary scanning clock signal ACK to a frequency corresponding to a desired auxiliary scanning speed. In FIG. 18, the horizontal axis represents time indicative of the integrated value of the preset value, and the vertical axis represents the reciprocal (pulse rate) of the frequency-dividing ratio Ddiv.

As described above, the above embodiment is applied to the light beam image recording apparatus 10 wherein the exposure head 36 as a recording head scans the printing plate 42 as a recording sheet held on the outer circumferential surface 40 of the drum 20 that is rotated by the main scanning motor 26 as a rotational drive source, in the main scanning direction X perpendicular to the axis of the drum 20 for thereby recording an image on the printing plate 42. At the same time, the exposure head 36 is moved by the auxiliary scanning motor 32 in the auxiliary scanning direction Y substantially perpendicular to the main scanning direction X, for thereby forming a two-dimensional image on the plating plate 42.

Figure 19:
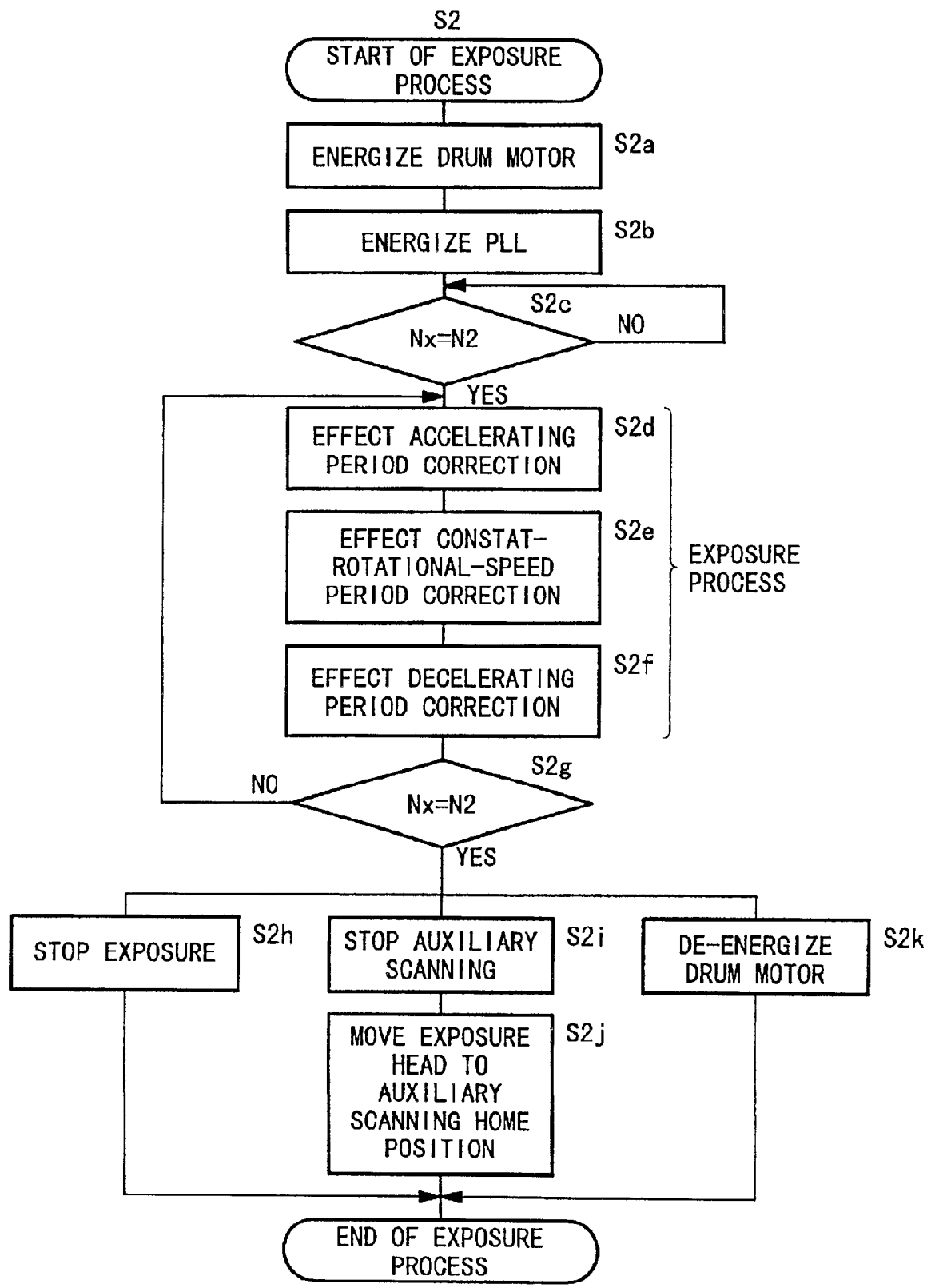
FIG. 19 is a flowchart of an exposure process according to the present invention.

FIG. 19 is a flowchart of the exposure process according to the present invention.

For recording a new image on the printing plate 42, the CPU circuit 52 controls the auxiliary scanning motor control circuit 56 to move the exposure head 36 from the home position detected by the home-position detector 39 to the recording start position.

At the same time, the CPU circuit 52 energizes the main scanning motor (drum motor) 26 based on a rotation command value Ni in step S2a.

When the drum 20 starts rotating, the PLL circuit 100 is energized by output pulses Pa from the rotary encoder 22 in step S2b.

In step S2c, the speed detector 130 detects the actual drum rotational speed Nx, and the start speed comparator 132 compares the detected actual drum rotational speed Nx with the recording start speed N2.

At the time t1 when the detected actual drum rotational speed Nx is equal to the recording start speed N2, an actual exposure process is initiated. First, an accelerating period correcting process is carried out in step S2d.

In the accelerating period correcting process, the delay time Td1 is read from the accelerating period corrective delay time storage area 53b (see FIG. 6) and set in the delay circuit 110. The delay time of the delay circuit 110 which has been set to the delay time Td2 at the time t0 is sent as the pixel clock CK that is delayed by the delay time td1 (see FIG. 4C) at the time t1 to the exposure control circuit 54.

In the auxiliary scanning motor control circuit 56, a frequency-dividing ratio Ddiv=100 and a preset value Dpre= 50 which have been read from the speed setting memory 178 are set in the counter 174 at the time t0.

When the recording start trigger Tst is supplied to the counter 174 and the auxiliary scanning motor 32 at the time t1, the counter 174 starts counting pulses, and the auxiliary scanning motor 32 starts moving the exposure head 36 in the auxiliary scanning direction Y at a speed inversely proportional to the frequency-dividing ration Ddiv=100.

At the time T1, the laser output Pwa is read from the accelerating period laser output storage area 53d, and set in the DAC 150 (see FIG. 13).

Image data Di read from the data buffer 120 in synchronism with the pixel clock signal CK is supplied to the switching circuit 162 (see FIG. 13) to record an image on the printing plate 42 with the laser beam L depending on the laser output Pwa.

Similarly, in the constant-rotational-speed period CS in step S2e and the decelerating period SS in step S2f, the delay circuit 110 connected to the output terminal of the PLL circuit 100, the auxiliary scanning motor 32, and the light source control circuit 122a are controlled based on the data stored in the corrective memory 53 and the data stored in the speed setting memory 178 until the actual drum rotational speed Nx becomes Nx=N2 in step S2g. Accordingly, the exposure process is performed on the printing plate 42 for thereby recording an accurate image on the printing plate 42.

Thereafter, the exposure process is stopped in step S2h, the movement of the optical system in the auxiliary scanning direction Y is stopped in step S2i, and the exposure head 36 is returned to the home position in the auxiliary scanning direction Y in step S2j. In step S2k, the drum motor is de-energized. In this manner, the exposure process in step S2 is ended.

By thus recording an image in the accelerating period AS and the decelerating period SS as well as in the constant-rotational-speed period CS, the effect of any loss of the recording time due to the startup time and shutdown time of rotation of the drum 20 is minimized, and the productivity (cycle time) of recording on the printing plate 42 can be increased at a low cost.

The present invention is not limited to the above embodiments, but may be changed and modified in various ways without departing from the scope thereof.

Figure 20:
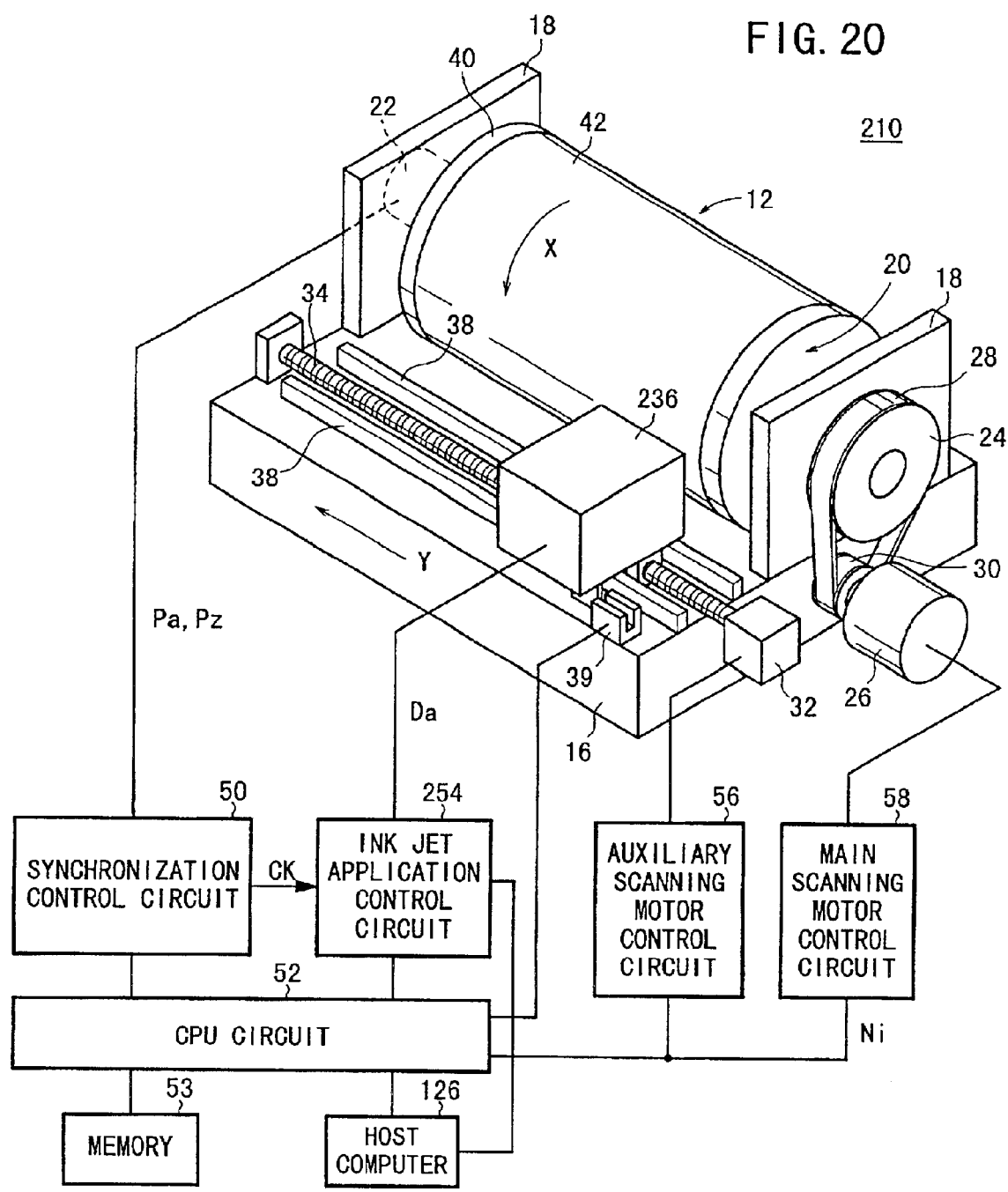
FIG. 20 is a perspective view, partly in block form, of an external-surface-scanning ink-jet image recording apparatus according to another embodiment of the present invention.

For example, the present invention may be applied to an external-surface-scanning ink-jet image recording apparatus 210 shown in FIG. 20 in which the exposure control circuit 54 and the exposure head 36 in the light beam image recording apparatus 10 shown in FIG. 1 are replaced with an ink jet application control circuit 254 including an ink jet driver and an ink jet recording head 236, respectively. The external-surface-scanning ink-jet image recording apparatus 210 may be used directly as a printing machine such as an offset printing machine.

Specifically, if the external-surface-scanning ink-jet image recording apparatus 210 is used as a printing machine, a recording sheet 242 such as an aluminum printing plate whose surface has been made hydrophilic is wound around the drum 20 as a plate cylinder. Lipophilic ink is ejected from the ink jet recording head 236 in the main scanning direction X based on the image data Di and applied to the recording sheet 242 around the drum 20 which is rotating, thus recording an image on the recording sheet 242. At the same time, the ink jet recording head 236 is moved in the auxiliary scanning direction Y to record a two-dimensional image of selectively applied lipophilic ink on the recording sheet 242. The image is recorded in each of the accelerating period AS, the constant-rotational-speed period CS, and the decelerating period SS.

In this manner, a halftone-dot image of selectively applied lipophilic ink can be formed in a short period of time on the recording sheet 242 which is hydrophilic in its entirety.

For printing the image, a water applicator roller (not shown) applies dampening water to the recording sheet 242, and a printing ink applicator roller (not shown) coats a printing ink on the recording sheet 242. The coated printing ink is applied to only the halftone-dot image of selectively applied lipophilic ink on the recording sheet 242. When the coated printing ink is then transferred from the recording sheet 242 to a printing sheet (not shown), a print with the halftone-dot image formed thereon is produced.

The external-surface-scanning ink-jet image recording apparatus 210 is advantageous in that it does not require a developing process for developing an image and a fixing process for fixing an image.

The principles of the present invention are applicable to various image recording apparatus which require a drum system to be corrected, such as a light beam recording apparatus, an ink jet recording apparatus, etc.

According to the present invention, as described above, an image can be recorded on a recording sheet on a drum by an image recording means while the drum is being rotated. In addition, an image can be recorded on a recording sheet during a startup time in an accelerating period in which the rotational speed of the drum increases from a stop to a constant rotational speed and/or during a shutdown time in a decelerating period in which the rotational speed of the drum decreases from the constant speed to a stop. Therefore, the loss time is minimized, and the productivity (cycle time) of recording on the recording sheet can be increased.

Stated otherwise, an overall image can be recorded in a short period of time on a recording sheet which is rotating.

According to the present invention, since it is not necessary to change the output of the rotational drive source of the drum, the productivity can be increased without increasing the electric power, cost, volume, weight, etc. of the rotational drive source.

By increasing the output of the rotational drive source, it becomes possible to record an image in a shorter period of time for higher productivity.

Although certain preferred embodiments of the present invention have been shown and described in detail, it should be understood that various changes and modifications may be made therein without departing from the scope of the appended claims.

What is claimed is:

1. An apparatus for recording a two-dimensional image on a recording sheet held on an outer circumferential surface of a drum rotated by a rotational drive source by scanning the recording sheet with a recording head in a main scanning direction perpendicular to an axis of said drum and moving said recording head with an auxiliary scanning direction moving means in an auxiliary scanning direction extending along the axis of said drum which is substantially perpendicular to said main scanning direction, wherein said recording head comprises means for recording an image on the recording sheet held on the outer circumferential surface of the drum in at least one of an accelerating period in which said rotational drive source accelerates said drum from a stop to a constant rotational speed and a decelerating period in which said rotational drive source decelerates said drum from said constant rotational speed to a stop.

2. An apparatus according to claim 1, wherein said apparatus records an image with a light beam outputted from said exposure head to said recording sheet as a light beam image recording apparatus.

3. An apparatus according to claim 1, wherein said apparatus records an image by applying an ink from an ink jet recording head to said recording sheet as an external-surface-scanning ink-jet image recording apparatus.

4. The apparatus of claim 1,
wherein the acceleration period is characterized by an incremental change in speed of the drum, and
wherein the deceleration period is characterized by a decremental change in speed of the drum.

5. An apparatus for recording a two-dimensional image on a recording sheet held on an outer circumferential surface of a drum rotated by a rotational drive source by scanning the recording sheet with a recording head in a main scanning direction perpendicular to an axis of said drum and moving said recording head with an auxiliary scanning direction moving means in an auxiliary scanning direction extending along the axis of said drum which is substantially perpendicular to said main scanning direction, wherein said recording head comprises means for recording an image on the recording sheet held on the outer circumferential surface of the drum in at least one of an accelerating period in which said rotational drive source accelerates said drum from a stop to a constant rotational speed and a decelerating period in which said rotational drive source decelerates said drum from said constant rotational speed to a stop, and in a constant-rotational-speed period in which said rotational drive source rotates said drum at said constant rotational speed, further comprising:
recording position correcting means for correcting the position in which said recording head records the image on the recording sheet depending on the peripheral speed of said drum in at least one of said accelerating period and said decelerating period; and
recording output correcting means for correcting a recording output from said recording head depending on the peripheral speed of said drum.

6. An apparatus according to claim 5, wherein said recording position correcting means comprises means for changing the speed of said recording head moved by said auxiliary scanning direction moving means.

7. An apparatus according to claim 5, wherein said recording head comprises means for recording the image depending on a main scanning write clock signal generated depending on the rotational speed of said drum, and said recording position correcting means comprises means for changing the frequency of said main scanning write clock signal.

8. An apparatus according to claim 5, wherein said recording position correcting means comprises a PLL circuit for detecting the rotational speed of said drum and generating a main scanning write clock signal, and means for changing the frequency of said main scanning write clock signal by incorporating a variation corresponding to a change in the rotational speed of said rotational drive source into said PLL circuit.

9. An apparatus according to claim 8, wherein said recording position correcting means comprises means for starting correcting the position in which said recording head records the image on the recording sheet when the rotational speed of said drum becomes equal to or higher than a predetermined speed in said accelerating period.

10. An apparatus according to claim 8, wherein said recording position correcting means is connected to a recorded-amount-of-image detecting means for detecting an amount of image to be recorded on said recording sheet, and comprises means for starting correcting the position in which said recording head records the image on the recording sheet in said decelerating period when said recorded-amount-of-image detecting means detects that a remaining amount of image to be recorded reaches a predetermined amount.

11. An apparatus according to claim 5, wherein said recording position correcting means comprises a PLL circuit for detecting the rotational speed of said drum and generating a main scanning write clock signal, and a delay circuit connected to an output terminal of said PLL circuit for delaying a predetermined delay depending on the rotational speed of said rotational drive source in said accelerating period or said decelerating period for generating a delayed main scanning write clock signal.

12. The apparatus of claim 5, wherein said apparatus records an image with a light beam outputted from said exposure head to said recording sheet as a light beam image recording apparatus.

13. The apparatus of claim 5, wherein said apparatus records an image by applying an ink from an ink jet recording head to said recording sheet as an external-surface-scanning ink-jet image recording apparatus.

14. A method of recording an image with an image recording apparatus for recording a two-dimensional image on a recording sheet held on an outer circumferential surface of a drum rotated by a rotational drive source by scanning the recording sheet with a recording head in a main scanning direction perpendicular to an axis of said drum and moving said recording head with an auxiliary scanning direction moving means in an auxiliary scanning direction extending along the axis of said drum which is substantially perpendicular to said main scanning direction, said method comprising the step of:
recording an image on the recording sheet held on the outer circumferential surface of the drum with said recording head in at least one of an accelerating period in which said rotational drive source accelerates said drum from a stop to a constant rotational speed and a decelerating period in which said rotational drive source decelerates said drum from said constant rotational speed to a stop.

15. A method according to claim 14, wherein said image recording apparatus comprises a light beam image recording apparatus for recording an image with a light beam outputted from said exposure head to said recording sheet.

16. A method according to claim 14, wherein said image recording apparatus comprises an external-surface-scanning ink-jet image recording apparatus for recording an image by applying an ink from an ink jet recording head to said recording sheet.

17. The method of claim 14,
wherein the acceleration period is characterized by an incremental change in speed of the drum, and
wherein the deceleration period is characterized by a decremental change in speed of the drum.

18. An apparatus for recording a two-dimensional image on a recording sheet placed on a circumferential surface of a drum rotated by a rotational drive source by scanning the recording sheet with a recording head in a main scanning direction perpendicular to an axis of said drum and moving said recording head with an auxiliary scanning direction moving means in an auxiliary scanning direction extending along the axis of said drum which is substantially perpendicular to said main scanning direction, wherein said recording head comprises means for recording an image on the recording sheet moved by rotation of the drum in at least one of an accelerating period in which said rotational drive source accelerates said drum up to a constant rotational speed and a decelerating period in which said rotational drive source decelerates said drum from said constant rotational speed.

19. An apparatus according to claim 18, further comprising:

recording position correcting means for correcting the position in which said recording head records the image on the recording sheet depending on the peripheral speed of said drum in at least one of said accelerating period and said decelerating period; and recording output correcting means for correcting a recording output from said recording head depending on the peripheral speed of said drum.

20. An apparatus according to claim 19, wherein said recording position correcting means comprises a PLL circuit for detecting the rotational speed of said drum and generating a main scanning write clock signal, and means for changing the frequency of said main scanning write clock signal by incorporating a variation corresponding to a change in the rotational speed of said rotational drive source into said PLL circuit.

21. The apparatus of claim 18, wherein the acceleration period is characterized by an incremental change in speed of the drum, and wherein the deceleration period is characterized by a decremental change in speed of the drum.

22. A method of recording an image with an image recording apparatus for recording a two-dimensional image on a recording sheet placed on a circumferential surface of a drum rotated by a rotational drive source by scanning the recording sheet with a recording head in a main scanning direction perpendicular to an axis of said drum and moving said recording head with an auxiliary scanning direction moving means in an auxiliary scanning direction extending along the axis of said drum which is substantially perpendicular to said main scanning direction, said method comprising the step of: recording an image on the recording sheet moved by rotation of the drum with said recording head in at least one of an accelerating period in which said rotational drive source accelerates said drum up to a constant rotational speed and a decelerating period in which said rotational drive source decelerates said drum from said constant rotational speed.

23. The method of claim 22, wherein the acceleration period is characterized by an incremental change in speed of the drum, and wherein the deceleration period is characterized by a decremental change in speed of the drum.

* * * * *